United States Patent [19]
Yelon et al.

[11] Patent Number: 5,968,326
[45] Date of Patent: Oct. 19, 1999

[54] COMPOSITE INORGANIC-POLYMER THIN FILM CATION-SELECTIVE MEMBRANE, METHOD OF FABRICATING SAME AND APPLICATIONS

[75] Inventors: Arthur Yelon, Westmount; Michael Paleologou, Beaconsfield, both of Canada; Dentcho Ivanov, Millburn, N.J.; Ricardo Izquierdo, Montreal; Michel Meunier, Pierrefonds, both of Canada

[73] Assignees: Pulp and Paper Research Institute of Canada, Pointe Claire; Ecole Polytechnique, Montreal, both of Canada

[21] Appl. No.: 09/056,714

[22] Filed: Apr. 8, 1998

Related U.S. Application Data
[60] Provisional application No. 60/043,283, Apr. 11, 1997.

[51] Int. Cl.$^6$ ..................................................... C25B 13/00
[52] U.S. Cl. .......................... 204/296; 204/252; 204/254; 204/264; 204/268; 204/418; 204/192.1; 204/192.11; 204/192.12; 204/192.14; 204/192.15; 521/27
[58] Field of Search .................................... 204/296, 252, 204/254, 264, 268, 418, 192.1, 192.11, 192.12, 192.14, 192.15; 521/27

[56] References Cited

U.S. PATENT DOCUMENTS

| | | | |
|---|---|---|---|
| 2,829,095 | 4/1958 | Oda et al. | 204/98 |
| 4,024,043 | 5/1977 | Dege et al. | 204/296 |
| 4,082,835 | 4/1978 | Chlanda et al. | 423/242 |
| 4,116,889 | 9/1978 | Chlanda et al. | 521/27 |
| 4,592,817 | 6/1986 | Chlanda et al. | 204/182.4 |
| 4,715,939 | 12/1987 | Ball et al. | 204/182.4 |
| 4,990,413 | 2/1991 | Lee et al. | 429/191 |
| 5,006,211 | 4/1991 | Paleologou et al. | 204/182.4 |
| 5,290,405 | 3/1994 | Joshi et al. | 204/419 |
| 5,308,468 | 5/1994 | Katoh et al. | 204/419 |
| 5,580,430 | 12/1996 | Balagopal et al. | 204/252 |
| 5,593,552 | 1/1997 | Joshi et al. | 204/165 |
| 5,679,482 | 10/1997 | Ehrenberg et al. | 204/296 |

OTHER PUBLICATIONS

M. Paleologou et al., A Solution to Caustic/Chlorine Imbalance: Bipolar Membrane Electrodialysis, J. Pulp Paper Sci., 18, J138(1992) no month available.

The Principles of Ion Selective Electrodes and of Membrane Transport, W.E. Morf. Ed. Elsevier Pub. Co. Amsterdam, 1988Chap.10 no month available.

Ion–Selective Electrode Methodology, A.K. Covington, Ed., CRS Press, Boca Raton, 1979 (book) no month available.

Hong, H.Y–P., Crystal Structures and Crystal Chemistry in the System $Na_{1+4}Zr_2Si_xP_{3-x}O1_2$, Mat. Res. Bull., 11, 173, 1976 no month available.

Fabry, P., Huang, Y.L. Caneiro, A. Patrat, G. Dip–coating Process for Preparation of Ion–sensitive NASICON thin films, Sensors and Actuators, B6, 299, 1992 no month available.

Damasceno, O., Siebert, E., Dhireddine, H., Fabry, P., Ionic Exchange and Selectivity of NASICON Sensitive Membranes, Sensors and Acuators, B8, 245, 1992 no month available.

Chrisey, D.B. and Inam, A., MRS Bulletin, XVII, No. 2, 37, 1992, Pulsed Laser Deposition of High Tc Superconducting Thin Films for Electronic Device Applications no month available.

Handbook of Sputter Deposition Technology, K. Wasa and S. Hayakawa, Noyers Publications, New Jersey, 1992, pp. 81–123 no month available.

*Primary Examiner*—Bruce F. Bell
*Attorney, Agent, or Firm*—Swabey Obilvy Renault

[57] ABSTRACT

A composite membrane is disclosed fabricated by depositing an inorganic ion-conducting thin film on a cation-selective organic polymer membrane substrate using Pulse Laser Deposition (PLD) or reactive magnetron sputtering. The fabricated membrane combines the advantages of the polymeric membrane including flexibility and low electrical resistance, with the advantages of the inorganic membrane film including resistance to fouling, high selectivity for alkali metal ions over hydrogen ions and resistance to oxidizing chemicals; electromembrane systems and processes for example alkali metal sensing electrodes and other membrane-based electrochemical detectors, electrolytic and electrodialytic systems incorporate such membranes thus improving their performance in terms of current efficiency, salt to acid conversion ratio, reliable operation and membrane life.

20 Claims, 15 Drawing Sheets

FIG_10

COMPOSITE INORGANIC-POLYMER THIN FILM CATION-SELECTIVE MEMBRANE, METHOD OF FABRICATING SAME AND APPLICATIONS

CROSS REFERENCE TO RELATED APPLICATION

This application is related to U.S. Ser. No. 60/043,283 filed Apr. 11, 1997, and the benefit under 35 U.S.C. 119(e) of such U.S. application is claimed.

BACKGROUND OF THE INVENTION

1. Field of Invention

The present invention relates to a composite membrane which is fabricated by depositing an inorganic ion-conducting thin film on a cation-selective organic polymer membrane substrate using Pulse Laser Deposition (PLD) or reactive magnetron sputtering. Furthermore, the present invention relates to various electromembrane systems incorporating such membranes to improve their performance. In particular, these membranes are useful in electrolysis and bipolar membrane electrodialysis systems for the production of sodium hydroxide and acid from solutions of alkali metal salts.

2. Description of the Prior Art

Cation-selective organic polymer membranes are used in a variety of applications in the biological, medical, chemical, food, pulp and paper and other industries. In particular, such membranes are used in electrolytic systems (e.g. chloralkali cells for the production of chlorine and sodium hydroxide from sodium chloride), electrodialysis systems (e.g. desalination of brackish and sea water), bipolar membrane electrodialysis systems (e.g. splitting of the salts of organic acids into sodium hydroxide and organic acid) and fuel cells. Examples of such membranes are: Nafion (a trademark of E.I DuPont de Nemours, Wilmington, Del., USA), Tokuyama Soda Neosepta (trade-mark) CMX, CM-1 and CM-2, Asahi Glass Selemion (trade-mark) CMV and CSV and Raipore R-4010 and R-1010 (trade-marks of RAI Research Corporation, Hauppauge, N.Y., USA). New applications involving organic polymeric cation-selective membranes are constantly being developed (Paleologou, M. and Berry, R. M., Electrodialytic Water-Splitting Process for the Treatment of Aqueous Electrolytes, U.S. Pat. No. 5,006,211, Apr. 9, 1991; Paleologou, M., Wong, P-Y., Berry, R. M., A Solution to Caustic/Chlorine Imbalance: Bipolar Membrane Electrodialysis, J. Pulp Paper Sci., 18, J138 (1992).

A typical unit electrolysis cell employs two electrodes, an anode and a cathode, with a cation-selective membrane between them. In a particular application, sodium sulphate is fed into the anode compartment and water (or a dilute sodium hydroxide solution) is fed into the cathode compartment. When a voltage is applied between the two electrodes, the sodium ions migrate through the membrane towards the negative electrode where they combine with hydroxide ions, generated from the reduction of water at the cathode, to produce sodium hydroxide. The migrating sodium ions in the anode compartment, are replaced by hydrogen ions, generated by the oxidation of water at the anode, to produce sulphuric acid. Thus, the product from the anode compartment is acidified sodium sulphate, and the product from the cathode compartment is sodium hydroxide. To reduce capital and operating costs, bipolar membranes can be incorporated into such a system in an alternate arrangement with cation-selective membranes, in which case, it is referred to as a bipolar membrane electrodialysis (BME) system (Paleologou, M., Wong, P-Y., Berry, R. M., A Solution to Caustic/Chlorine Imbalance: Bipolar Membrane Electrodialysis, J. Pulp Paper Sci., 18, J138 (1992). The generation of new products (acid and base) distinguishes BME from conventional electrodialysis (ED), which simply employs alternate cation- and anion-selective membranes in between two electrodes for the concentration and/or dilution of salt solutions. The low capital and operating costs associated with BME and ED, as compared to electrolysis, are due to the stacking of numerous unit cells in between two electrodes of small area.

At present, a variety of inorganic ion-selective membranes made of solid state ionic conductors are known (The Principles of Ion Selective Electrodes and of Membrane Transport, W. E. Morf, Ed., Chapter 10, Elsevier Pub., Co., Amsterdam, 1988; Ion-Selective Electrode Methodology, A. K. Covington, Ed., Chapter 9, CRS Press, Boca Raton, 1979). Such materials include metal super ion conducting materials (MESICON) suitable for the fabrication of ceramic ion-conducting membranes with high ion conductivity at low temperature, high selectivity for alkali metal ions and comparative stability in water and corrosive media (Balagopal, S. H., Gordon, J. H., Virkar, A. V., Joshi, A. V. Selective Metal Cation-conducting Ceramics, U.S. Pat. No. 5,580,430, Dec. 3, 1996). Among them, the three-dimensional framework fast ion conductors of the family NASICON (Hong, H. Y-P., Crystal Structures and Crystal Chemistry in the System $Na_{1+4}Zr_2Si_xP_{3-x}O_{12}$, Mat. Res. Bull., 11, 173, 1976) have been studied extensively and found to be appropriate for the fabrication of ion-selective membranes (Fabry, P., Huang, Y. L., Caneiro, A., Patrat, G., Dip-coating Process for Preparation of Ion-sensitive NASICON thin films, Sensors and Actuators, B6, 299, 1992; Damasceno, O., Siebert, E., Khireddine, H., Fabry, P., Ionic Exchange and Selectivity of NASICON Sensitive Membranes, Sensors and Actuators, B8, 245, 1992). The polymer membranes have the advantage of being more flexible than the inorganic membranes and, therefore, easier to use in electromembrane cells. However, they exhibit lower ion conductivity and selectivity, and they can be fouled by multivalent metal ions.

An electrolytic approach for the production of sodium hydroxide using a thick ceramic membrane of Nasicon coated by a polymer film of Nafion was previously demonstrated (Joshi, A., Liu, M., Bjorseth, A. and Renberg, L., NaOH Production from Ceramic Electrolytic Cell, U.S. Pat. No. 5,290,405, Mar. 1, 1994). The main disadvantage of this ceramic/polymer membrane is that the ceramic is the substrate, with a thickness of 1.5 mm, on top of which the polymer film is deposited. Such structures are expected to lead to several operational problems in electromembrane systems: (i) the thick ceramic substrate is not very flexible leading to leaking from electromembrane cells, and (ii) the ion fluxes through the membrane are reduced due to the thickness of the ceramic membrane, and (iii) the voltage drop across such membranes is rather high leading to increased energy costs. The operation of electromembrane systems usually involves current densities in the range of 0.1 to 1 A $cm^{-2}$. To maintain current densities from 0.1 to 1 A $cm^{-2}$, a 1-mm thick inorganic and, in particular, ceramic membrane must have a conductivity of the order of 0.1 $Scm^{-1}$ at room temperature. There is no ion conducting ceramic of 1-mm thickness which is able to provide such high conductivity at room temperature. Nasicon ($Na_{1+x}Zr_2Si_xP_{3-x}O_{12}$, where 0<x<3) is one of the best fast ionic conductors. At 300° C. this material, for x=2, exhibits a conductivity of 0.35 $Scm^{-1}$ and, at room temperature, the conductivity decreases to $10^{-3}$ Scm$^{-1}$. At room temperature, an ion current density of the order of 0.1 to 1 Acm$^{-2}$ can pass through a Nasicon membrane if the thickness of the membrane is less than 1 µm (1000 Å).

Mesicon and Nasicon materials have generally been produced as bulk materials. Thin films can be produced by various physical vapor deposition methods such as evaporation. However, in the case of Mesicon and, in particular, Nasicon materials, these techniques lead to a loss of the film stoichiometry. In order to produce thin films with good stoichiometry new methods have had to be developed. In recent years, PLD has emerged as one of the most suitable techniques for the deposition of inorganic and, in particular, ceramic materials with complex stoichiometry such as high $T_c$ superconductors (Chrisey, D. B. and Inam, A., MRS Bulletin, XVII, No. 2, 37, 1992). Another promising technique for the deposition of ceramic thin films on various substrates is reactive magnetron sputtering (Handbook of Sputter Deposition Technology, K. Wasa and S. Hayakawa, Noyers Publications, New Jersey, 1992, pp. 81–123). Since solid ionic conductors such as Nasicon are suitable ceramic materials, these techniques were used to deposit thin films of Nasicon on polymeric materials.

SUMMARY OF THE INVENTION

It is an object of this invention to provide a flexible composite cation-selective membrane.

It is a further object of this invention to provide a method for producing a flexible composite cation-selective membrane.

It is a still further object of this invention to provide improved electromembrane methods exploiting the composite membrane of the invention.

It is yet another object of this invention to provide a process for detection or quantitation of chemical species in a cell having an electrode probe and a composite membrane of the invention.

It is still another object of the invention to provide an improved electromembrane cell employing a composite membrane of the invention.

In accordance with one aspect of the invention there is provided a flexible composite cation-selective membrane comprising a membrane substrate of an ion-conducting organic polymer and a thin film on said substrate of an inorganic ion-conducting material.

In accordance with another aspect of the invention there is provided a method of producing a flexible composite cation-selective membrane comprising providing a membrane substrate of an ion-conducting polymer, and depositing on said substrate, a thin film of an inorganic ion-conducting material.

In accordance with still another aspect of the invention there is provided an improved electromembrane method in which a composite cation-selective membrane of the invention is disposed in a cell between a cathode and an anode and cations in the cell migrate through the membrane towards the cathode.

In accordance with yet another aspect of the invention there is provided an improved electromembrane cell comprising an anode and a cathode with a composite, cation-selective membrane therebetween.

In still another aspect of the invention, there is provided a process for detection or quantitation of a chemical species in a cell having an electrode probe and a composite cation-selective membrane of the invention.

BRIEF DESCRIPTION OF THE DRAWINGS

FIG. 12 is a plot comparing cumulative current efficiency in two different cells of the invention;

DESCRIPTION OF PREFERRED EMBODIMENTS

Figure 1:
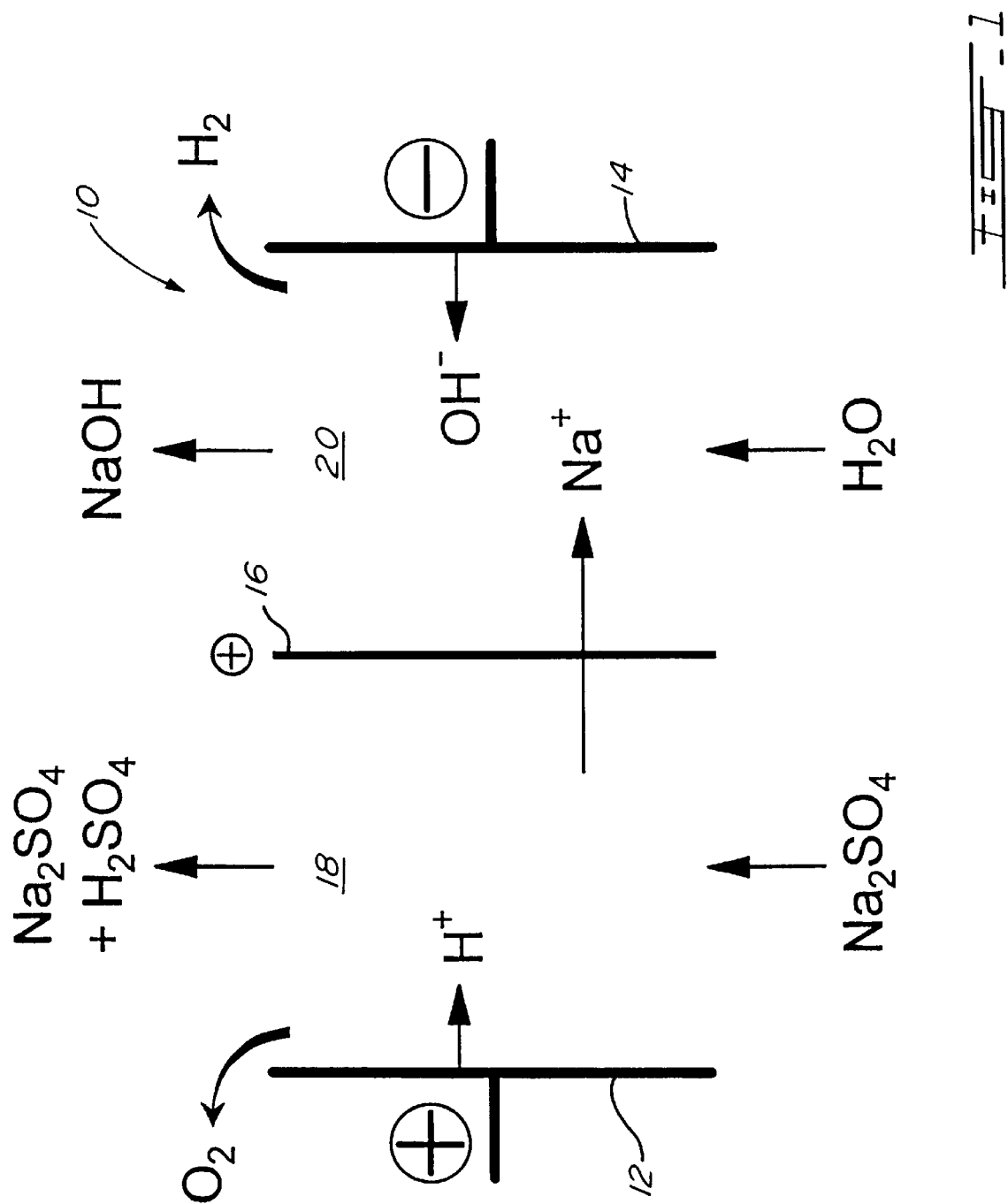
FIG. 1 is a schematic representation of a two compartment electrolysis cell.

Various inogranic materials may be employed to produce the inorganic thin film in the composite membrane of the invention. In particular, the inorganic materials are those which conduct the cations of interest notably sodium ions or potassium ions.

The inorganic material should also be one which is capable of being deposited as a thin film on a cation-selective organic polymer membrane as substrate.

Suitable inorganic materials includes the aforementioned Nasicon (sodium super ion conducting) and Mesicon (metal super ion conducting) type materials.

Mesicon materials may be represented as $Me_5Re_2Si_4O_{12}$ where Me is Na, Li, K or Ag, Re is Zr, Dy, Er, Gd, La, Nd, Sm, Yb or Y; they may be crystalline or amorphous or a mixture having both crystalline and amorphous character.

Nasicon materials are a sub class of Mesicon in which Me is Na and Re is Zr. Nasicon-type materials may also be employed. They are similar to Nasicon but differ in that Zr is replaced fully or in part by an element such as Fe, In, Sc, Y, Eu, Yb, Tm, Er, Ho, Dy, Tb, Gd, Sm, Nd, La, As, Ge, Ti, Th or Hf.

Doped Nasicon materials represent another suitable class of material for thin films in the composites of the invention; these doped materials have a composition similar to Nasicon but additionally include a small amount of dopant, typically on an amount in the range of 0 to 5%, by weight, suitable dopants include, Mg, Zn, Y, Ti, Sa, Nb and Ta.

Other suitable inorganic alkali metal ion conductors for forming the thin film includes sodium antimonate $NaSbO_3$ which may be undoped or doped with a dopant for example NaF or $Bi^{+5}$ forming doped materials such as $NaSbO_3.1/6NaF$ and $NaSb_{1-x}Bi_xO_3$. Still further materials include alumina, silica, aluminosilicates (zeolites, montmorillonites), gallates, borosilicates, phosphates, borates, aluminoborates and sulphatoborates, oxides of manganese, antimony and tin, metal halides, for example, cuprous chloride and metal sulphides, for example, cupric sulphide.

The invention contemplates the use of alkali metal ion conducting ceramics but is not confined to conventional crystalline ceramics and extends to materials in the nature of ceramics but having amorphous or mixed crystalline and amorphous character.

The inorganic material is formed as a thin film on the cation-selective polymer membrane substrate, which thin film suitably has a thickness of 10 Å to 10 µm, preferably 200 Å to 3000 Å.

The inorganic material is suitably deposited as the thin film on the membrane substrate, for example, by pulse laser deposition or reactive magnetron sputtering.

The deposition is effected from a source of the inorganic material and onto a surface of the membrane substrate. The deposition is carried out such that the stoichiometry of the inorganic material of the source is present in the deposited film. In particular, the ion conducting properties of the inorganic material are not negatively affected by the deposition process.

In the case of pulsed laser deposition the deposition is suitably carried out at an energy density of 0.01 to 10 $J/cm^2$.

In the case of reactive magnetron sputtering the deposition is suitably carried out at a pressure of 10 m Torr to 50 m Torr.

Various cation-selective polymer membranes are available commercially which may be employed as the substrate in the composite membrane of the invention.

Suitable substrate membranes are the Nafion, Neosepta, Selemion and Raipore membranes referred to hereinbefore. The substrate membrane suitably has a thickness of 0.02 mm to 0.5 mm, preferably 0.1 to 0.3 mm.

In particular two approaches have been developed for the fabrication of thin-film, cation-selective composite membranes. In accordance with the present invention, it has been discovered that such membranes may be fabricated by depositing an inorganic ion conducting thin film onto a polymer substrate using either a PLD technique or reactive magnetron sputtering.

The fabricated membranes combine the advantages of polymeric membranes (e.g. flexibility, low electrical resistance) with the advantages of inorganic membranes (e.g. resistance to fouling, high selectivity for alkali metal ions over hydrogen ions, resistance to oxidizing chemicals). When such membranes are incorporated into electromembrane systems (e.g. alkali metal sensing electrodes and other membrane-based electrochemical detectors, electrolytic and electrodialytic systems) it is possible to improve their operation in terms of any one or more of the following performance parameters: current efficiency, salt to acid conversion ratio, reliability and membrane life.

In this specification, "electromembrane cells" contemplate both electrolysis cells and electrodialysis cells.

DETAILED DESCRIPTION OF THE INVENTION WITH REFERENCE TO THE DRAWINGS

In general, the energy efficiency of electromembrane systems depends upon the ion conductivity, the ion selectivity, and the thickness of the cation-selective membrane. In two-compartment electrolysis systems (FIG. 1), in particular, the current efficiency depends on the selectivity of the cation-selective membrane to sodium over hydrogen ions as well as its ability to prevent the back-migration of hydroxide ions from the catholyte to the anolyte. The economic viability of such systems also depends upon the chemical stability of the cation-selective membranes in the solutions processed as well as its potential fouling by multivalent metal cations through the formation of insoluble hydroxides inside these membranes. In general, the feed salt solution could contain, in addition to sodium cations, multivalent metal cation impurities and the long-term durability of the cation-selective membrane will depend upon its ability to prevent such multivalent cations from entering the membrane. This means that the membrane must have a very high ion conductivity for the ion of interest and a very low ion conductivity for all other ion species. The mechanism of ion transport through polymeric membranes allows penetration of multivalent metal ions into the interior of the membrane thus causing membrane fouling. The mechanism, however, of ion transport through solid state fast ion conducting materials is quite different. A given ion may migrate through such a material via vacancies and/or defects in the structure of the material. The defect structure allows the transport of different ions only if they have comparable ion size and an appropriate electric charge. Polymer membranes have better mechanical properties than solid state ion conductors. The latter are rigid materials, while polymer membranes are flexible and easy to install in electromembrane cells. However, solid state fast ion conductors exhibit higher ion conductivity and selectivity than polymeric membranes. In addition, solid state fast ion conductors are stable at high temperatures and exhibit higher resistance to oxidizing chemicals.

With further reference to FIG. 1, a two compartment electrolysis cell 10 comprises anode 12 and cathode 14 separated by a cation-selective membrane 16. Anolyte compartment 18 is defined between anode 12 and membrane 16; and catholyte compartment 20 is defined between cathode 14 and membrane 16.

In accordance with the invention, it has been discovered that a composite, cation-selective membrane may be fabricated by depositing an inorganic ion conducting thin film onto a polymer substrate using either a pulse laser deposition (PLD) technique or reactive magnetron sputtering. The former technique can be briefly described as follows: The optical beam coming from a pulsed laser is focused at the surface of a target made of the material that one wishes to deposit as a thin film. The very high energy density impinging on the target induces an evaporative explosion with ejection of material from the target in a direction normal to the surface of the target. If a substrate is placed facing the target, deposition of a thin film will occur. A typical set-up for PLD is shown in FIG. 2.

Figure 2:
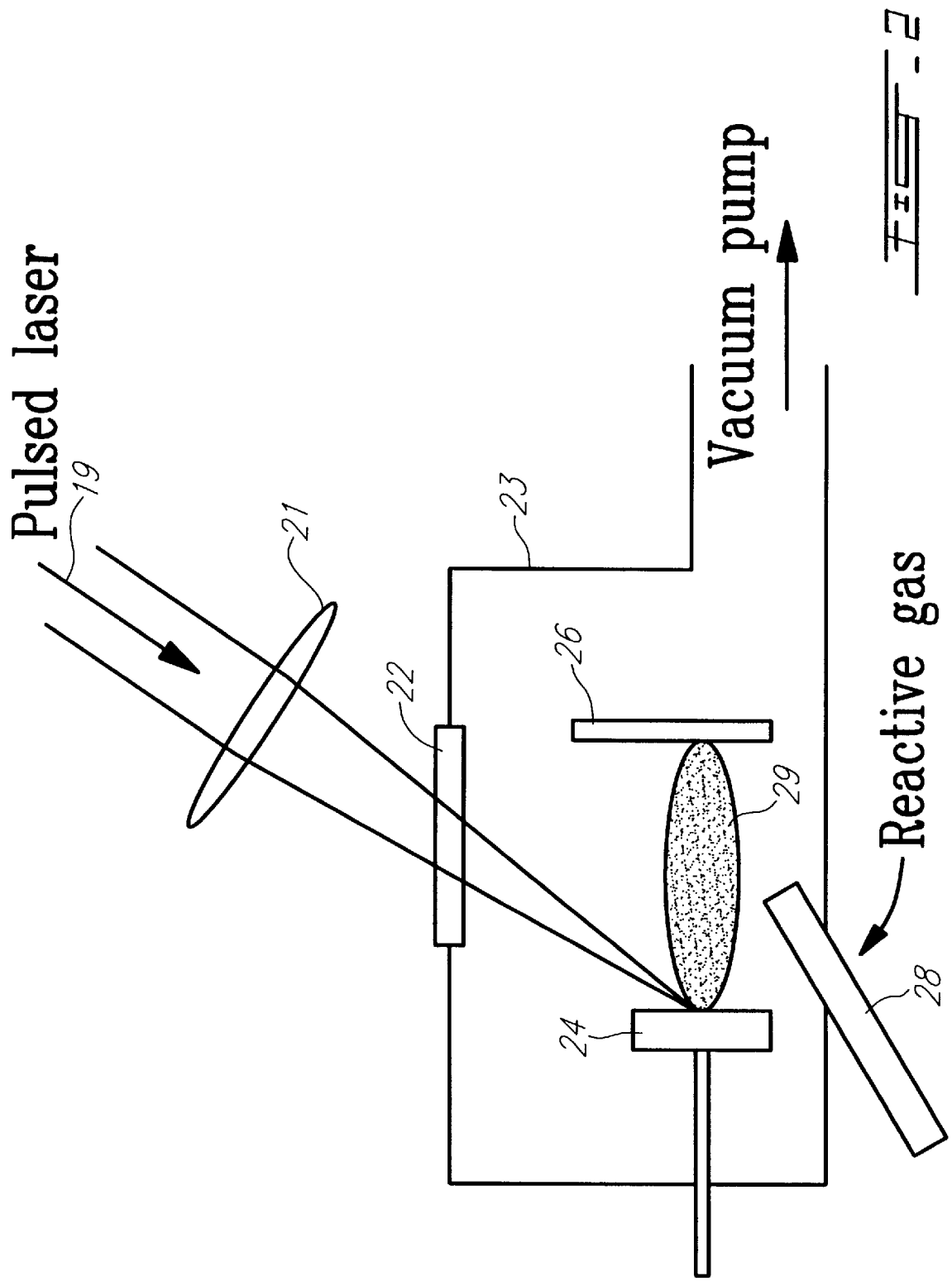
FIG. 2 is a schematic representation of an assembly for producing a composite membrane of the invention.

With further reference to FIG. 2, a pulsed laser 19 is directed from a source (not shown) through lens 21 and window 22 of a housing 23 onto a target 24 of a cation conducting inorganic material.

A cation-selective polymer membrane substrate 26 is in opposed relationship with target 24 in housing 23. Reactive gas is introduced between target 24 and substrate 26 by line 28. Housing 23 is connected to a a source of vacuum.

Plume 29 is formed between target 24 and substrate 26. The deposition rates used can range from 0.01 to 0.5 Å/pulse depending on deposition conditions. Using XPS measurements it can be shown that, when this approach is used, the target components including P and Na are well transmitted to the substrate and that the thin film composition is very similar to the one from the target. As most polymeric membranes can not be heated to very high temperatures, all depositions must be carried out at temperatures ranging from ambient temperature to the softening or melting point of the polymer. XRD measurements show that films deposited at low energy at room temperature are amorphous. Whereas at high energy densities (e.g. 2 J/cm$^2$), the films are partially crystalline. This is a very important characteristic as crystalline films are more conductive and more selective than amorphous films.

Similarly, thin films can be deposited onto substrates using reactive magnetron sputtering. Nasicon thin film membranes have been fabricated by reactive magnetron sputtering using Nasicon targets with the same compositions as those used in the case of the PLD. Thin film deposition by sputtering is initiated in a plasma by the collision between incident ions of the working gas (in general Ar) and the atoms (or molecules) of the target. The sputtering technique offers the advantage of being able to deposit thin films on large areas of substrate. Nasicon targets with various stoichiometries can be prepared by mixing powders of $Na_3PO_4$ and $ZrSiO_4$. The powder mixture is ground, pressed and sintered at high temperatures (e.g. 1270° C.) for a certain period of time (e.g. 6 hours). The targets are then installed on planar magnetrons with permanent magnets producing several hundred gauss magnetic field. The glow discharge is concentrated in the high magnetic field region. The magnetron sputtering of Nasicon can be conducted at working pressures in the range of 10 mTorr to 50 mTorr. Using XPS, Auger and XRD analysis we have shown that the structure and morphology of Nasicon-thin films deposited on polymeric membranes by sputtering is similar to films deposited by the pulsed excimer laser technique.

Using the approaches outlined above, composite membranes can be formed by depositing thin film of inorganic materials on the polymer membrane in combination. These composite membranes exhibit better performance than either the inorganic or the organic polymer membrane alone. The composite membrane is as flexible as the polymer membrane but it is more selective, due to the ion-conductive inorganic thin film. The inorganic membrane may be chosen to exhibit an excellent resistance to acid.

Figure 3:
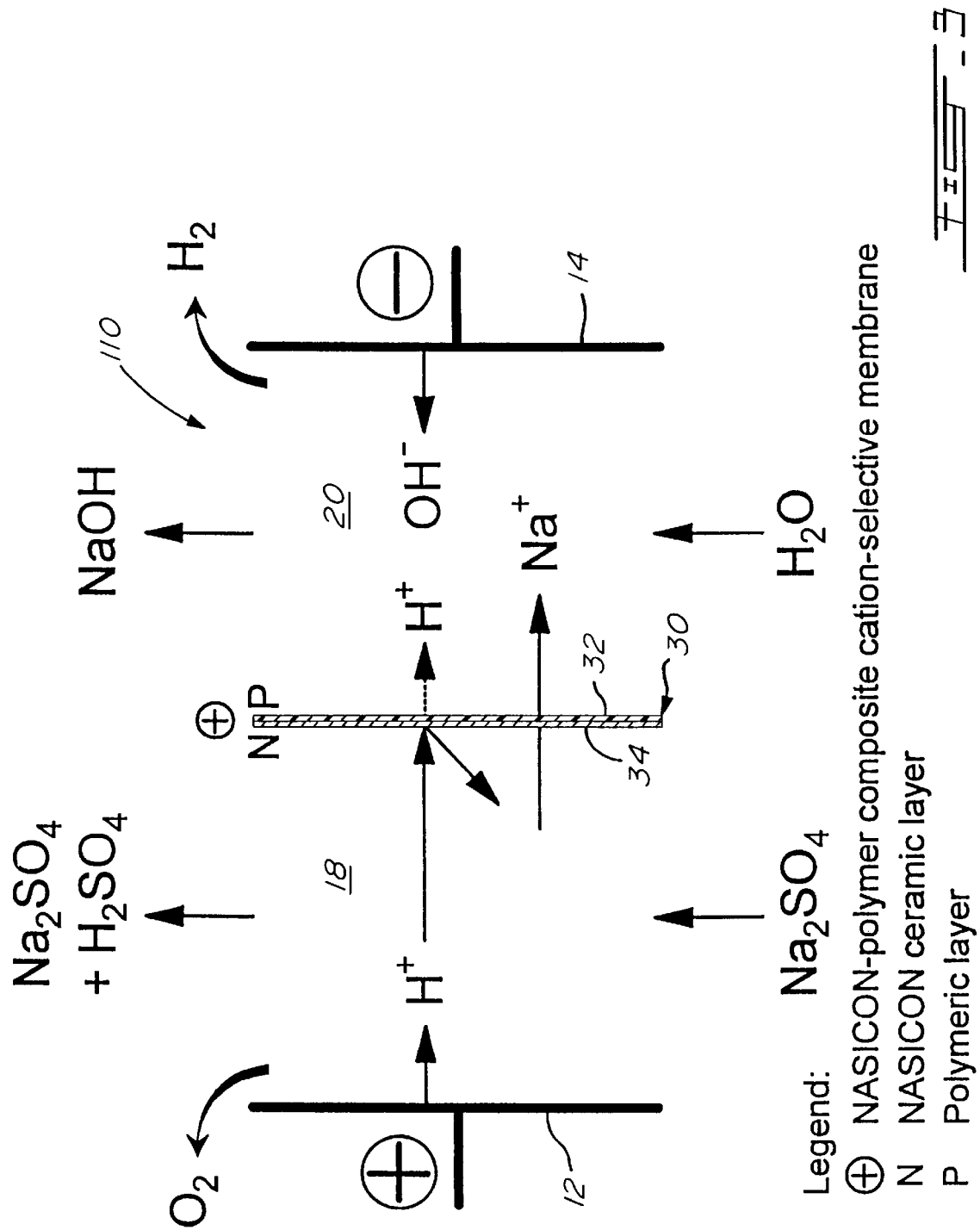
FIGS. 3 and 4 are schematic representations of an electrolysis cell incorporating a composite membrane of the invention.
Figure 4:
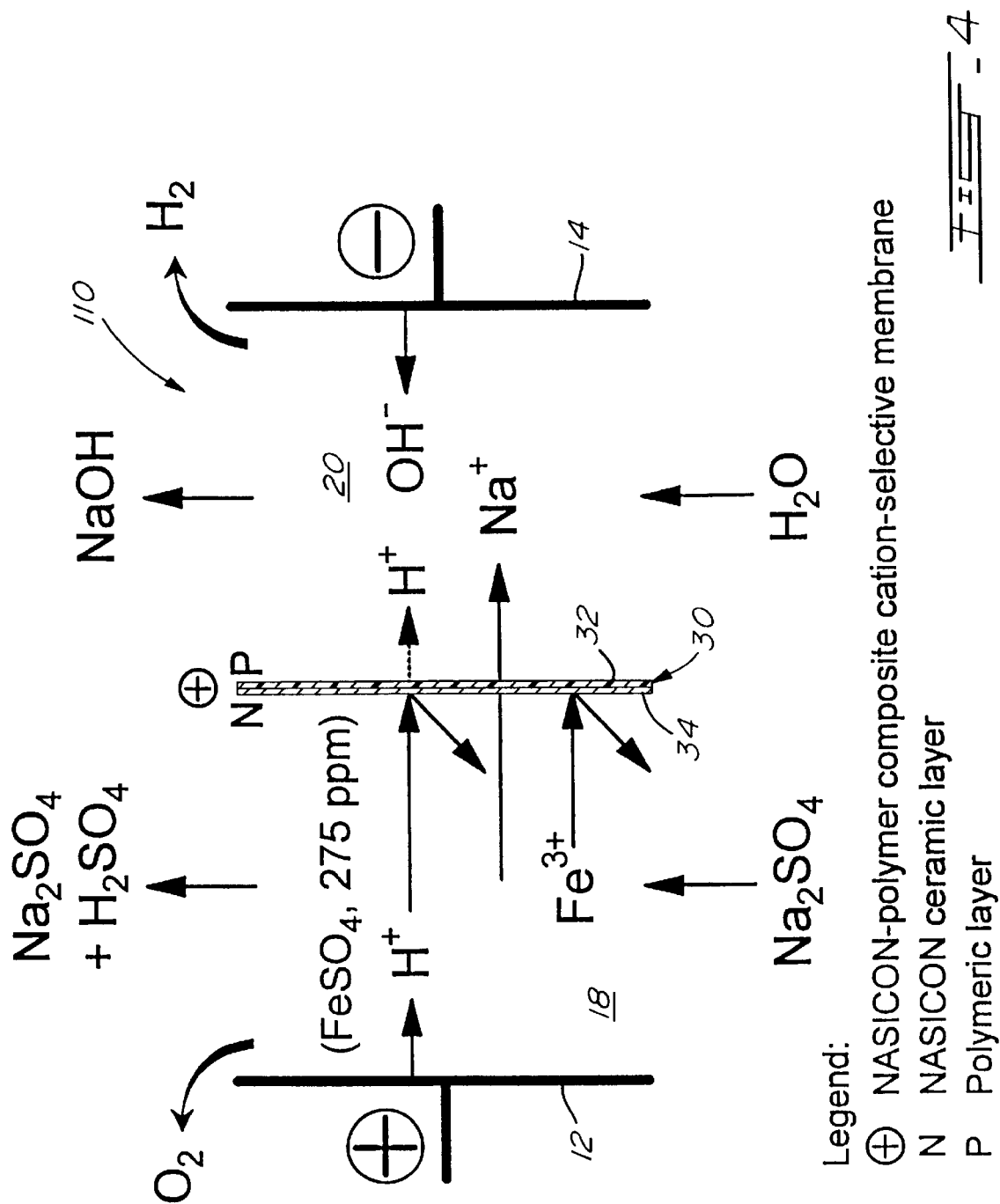

With further reference to FIGS. 3 and 4, an electrolysis cell 110 differs from cell 10 of FIG. 1 by inclusion of a composite membrane 30 comprising a cation-selective polymer membrane substrate 32 having a thin inorganic film 34.

When the membrane is oriented in the electrolysis cell in such a way as to have the inorganic film facing the anode compartment (FIG. 3), the current efficiency for the transport of sodium to the catholyte is higher than the corresponding polymer membrane. Furthermore the fouling resistance of the membrane increases significantly because multivalent metal ions can not penetrate the inorganic film (FIG. 4). Similar benefits can be realized in the case of electrodialysis (FIG. 5), bipolar membrane electrodialysis (FIG. 6) and membrane-based sensor systems which employ such membranes.

Figure 5:
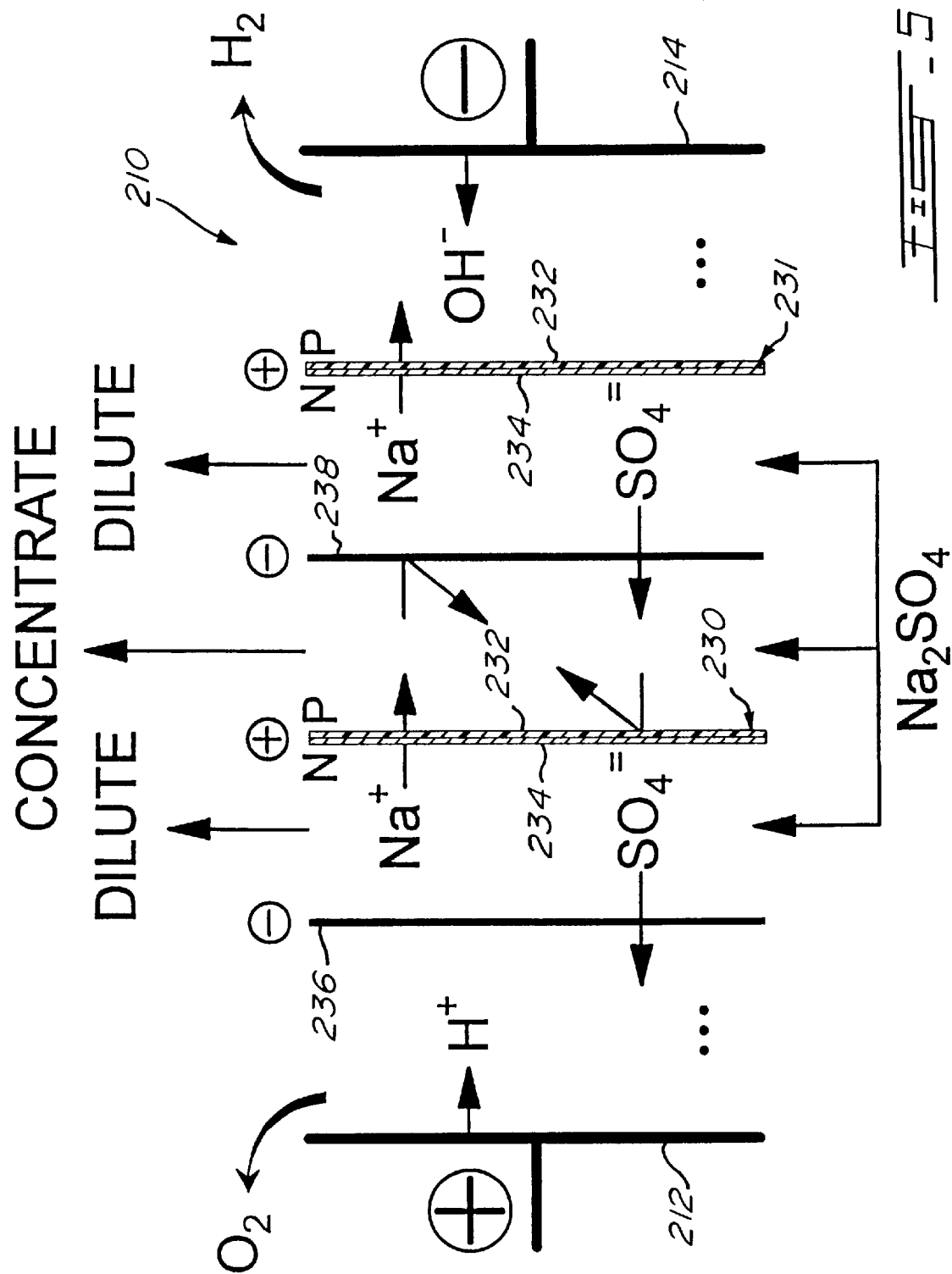
FIG. 5 is a schematic representation of a unit electrodialysis cell incorporating a composite membrane of the invention.

With further reference to FIG. 5, a unit electrodialysis cell 210 comprises an anode 212, a cathode 214 and a pair of composite membranes 230 and 231 therebetween. Composite membranes 230 and 231 each comprise a cation-selective polymer membrane substrate 232 having a thin inorganic film 234.

An anion selective membrane 236 is disposed between anode 212 and the composite membrane 230; and an anion selective membrane 238 is disposed between composite membranes 230 and 231.

Figure 6:
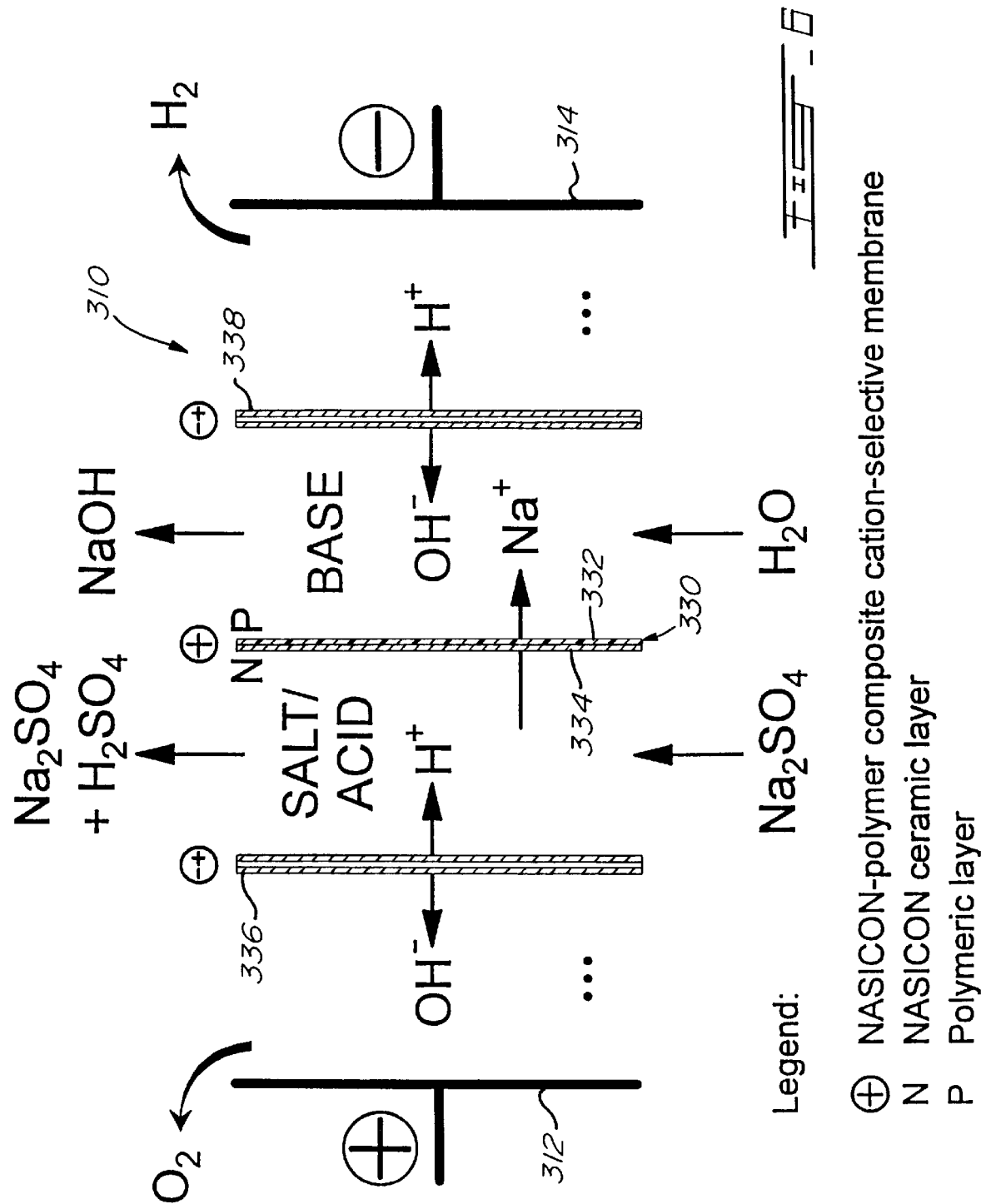
FIG. 6 is a schematic representation of a unit electrodialysis cell incorporating bipolar membranes and a composite membrane of the invention.

With further reference to FIG. 6, a unit bipolar membrane electrodialysis cell 310 comprises an anode 312, a cathode 314, a composite cation-selective membrane 330 and bipolar membranes 336 and 338; composite membrane 330 has a polymer membrane substrate 332 and a thin inorganic film 334.

The electrolysis systems referred to above are systems similar to that described in U.S. Pat. Nos. 5,290,405 and 5,580,430 employing two electrodes, an anode and a cathode, with a cation-selective membrane between them. The electrode materials must be stable in the media to which they are exposed. Suitable anodes can be made from nickel, cobalt, nickel tungstate, nickel titanate and other materials as well as noble metals. Suitable cathodes can made from various metals such nickel, cobalt, platinum and silver as well as alloys such as titanium carbide with small amounts of nickel, $FeAl_3$, $NiAl_3$ and other materials.

The electrodialysis systems referred to herein are similar to that described in U.S. Pat. No. 4,715,939 to Ball et al. Such systems are composed of a large number of cation-selective and anion-selective membranes alternately stacked between two electrodes. The current passed through the ED system in conventional fashion is direct current of a voltage dictated by the resistance of the membranes and the various solution streams between the two electrodes. Current densities between 5 and 150 mA per square centimeter are preferred. Higher or lower current densities are contemplated, however, for certain specific applications, as dictated by the limiting polarization current of the system in question. Electrodialysis can be employed for the concentration and/or dilution of salt, acid or base solutions and/or the separation of mixtures of salts, mixtures of acids and mixtures of bases into their component salts, acids and bases. Electrodialysis stacks that can be used include those from Asahi Glass Co., 1–2, Marunochi 2-chome, Chiyoda-Ku and Tokuyama Soda Co., Tokyo, Japan; Ionics Inc., Watertown, Mass. as well as other commercial sources.

The bipolar membrane electrodialysis systems referred to herein are similar to the three-compartment systems described in U.S. Pat. No. 4,592,817 to Chlanda et al. and the two-compartment systems referred to in U.S. Pat. No. 4,082,835 to Chlanda et al. (1979).

The three-compartment water splitter is typically composed of a large number of cation-selective, anion-selective and bipolar membranes stacked, in sequence, between two electrodes thereby forming a plurality of three-compartment units. Bipolar membranes are composite membranes consisting of three parts, a cation-selective region, an anion-selective region and the interface between the two regions. When a direct current is passed across a bipolar membrane with the cation-selective side toward the cathode, electrical conduction is achieved by the transport of $H^+$ and $OH^-$ ions which are obtained from the dissociation of water. The water splitter employs suitable bipolar membranes, that can be of the type described, for example, in U.S. Pat. No. 2,829,095 to Oda et al., in U.S. Pat. No. 4,024,043 (single film bipolar membranes), in U.S. Pat. No. 4,116,889 (cast bipolar membranes) or any other type which effectively converts water into hydrogen and hydroxyl ions. The cation-selective membranes useful in the process of the present invention can be weakly acidic or strongly acidic cation-selective membranes onto which a thin ceramic layer was deposited using any one of the two approaches described above. Examples of suitable cation-selective membranes are Nafion (Trade Mark)R 110, 901 and 324 of E.I. Du pont de Nemours & Co., Tokuyama Soda Neosepta CMX, CM-1 and CM-2, Asahi Glass Selemion CMV and CSV and Raipor® R-4010 and R-1010 (a trade mark of RAI Research Corporation, Hauppauge, N.Y., USA); other commercially available cation-selective membranes can be used a well. The anion-selective membranes useful in the process of the present invention can be weakly basic or strongly basic membranes such as 204-UZL-386 and AR 103 QZL-386 from Ionics, Watertown, Mass., Alll from Asahi Chemical, Tokyo, Japan, AMV from Asahi Glass Co., Tokyo, Japan, AV-4T and AVS-4T from Tokuyama Soda, Tokyo, Japan and R-4035 and R-1035 from RAI Research Corporation, Hauppage, N.Y. or monovalent anion-selective membranes such as the Selemion ASV membrane (Asahi Glass) and Neosepta ACS from Tokuyama Soda Co. The operating temperature of the three-compartment water splitter may be any temperature compatible with the membranes and above the freezing point of the solutions, preferably in the 20–60° C. temperature range. The feed into the salt compartments could be any soluble salt mixture composed of monovalent cations (e.g the Group Ia alkali metals (e.g. sodium and potassium) or the non-metal monovalent cations such as ammonium ions) and monovalent (e.g. anions of the Group VIIa elements) and polyvalent anions (e.g. sulphate, acetate, oxalate, etc.). The current passed through the water splitter in conventional fashion is direct current of a voltage dictated by the resistance of the membranes and the various solution streams between the two electrodes. Current densities between about 25 and 250 mA per square centimeter are preferred. Higher or lower current densities are contemplated, however, for certain specific applications. If the salt of an alkali metal is fed to the salt compartment, the result of the current flow is electrodialysis to produce a salt solution depleted in salt concentration in the salt compartments, a liquid comprising alkali metal hydroxide in the base compartments and a liquid comprising acid of the anion of the salt in the acid compartments. It is contemplated that by adjusting the water feed rates into the base and acid compartments and/or the current density, the concentration of the product alkali metal hydroxide solution and the product acid solution can be of any desired concentration to the extent limited by the reduction in current efficiencies that comes about as a result of back-diffusion of acid into the salt compartment.

The two-compartment water splitter is composed of a large number of bipolar and cation-selective membranes alternatively stacked between two electrodes. The cation-selective membranes useful in the process of the present invention can be weakly acidic or strongly acidic cation-selective membranes such as the ones described above (three-compartment splitter) onto which a thin ceramic layer was deposited using any one of the two approaches described above. The bipolar membranes used in the two-compartment water splitter may also be those described above for the three-compartment splitter. The same type of stacks used in the three-compartment water splitter can be used in the case of the two-compartment water splitter under similar operating conditions in terms of temperature, pressure between compartments, composition, concentration and pre-treatment of feed solutions, current density and other experimental parameters.

Membrane-based sensors (e.g. for alkali metal cations) employing the composite cation-selective membranes of this invention are expected be more resistant to fouling and interference by multivalent metal ions.

EXAMPLE 1

In this example, a Nasicon thin film was deposited on a polymeric Raipore R-4010 cation-selective membrane (manufactured by RAI Research Corporation) using the Pulsed Laser Deposition (PLD) technique. The energy density and the deposition rate were 0.8 $J/cm^2$ and 0.1 Å/pulse, respectively. XPS measurements showed that all the target components including P and Na were well transmitted to the substrate and that the thin film composition was very similar to that of the target. As the Raipore® membrane can not be heated to very high temperatures the deposition was carried out at room temperature. XRD measurements showed that the deposited film was amorphous. The thickness of the deposited film was 3000 Å.

Using the cells of FIGS. 1 and 3, the performance of a polymeric Raipore R-4010 cation-selective membrane manufactured by RAI Research Corporation (FIG. 1) and the composite membrane referred to above were tested. The latter membrane was incorporated into the electrolysis cell with the Nasicon side facing the anode (FIG. 3).

In both cells, the anode compartment was filled with 2 L of 1 M sodium sulfate and the cathode compartment with 8 L of 1 M sodium hydroxide and the two solutions were re-circulated through the system using a peristaltic pump. The membrane area was 1 $cm^2$ and the applied current density 150 $mA/cm^2$. The voltage of the cells was allowed to vary depending on changes in concentration of the anolyte and catholyte and other changes occurring in the cells. The anode compartment was run in the batch mode; in this mode of operation the starting solution is recirculated through the electrolysis cell and the concentration of acid allowed to build up. The cathode compartment was also run in the batch mode; given, however, the large volume of solution being recirculated and the small membrane area, the concentration of the base could not increase significantly over time. In this fashion, we were able to simulate feed-and-bleed operation of the base compartment. When a voltage was applied between the two electrodes, the sodium ions migrated through the membrane towards the negative electrode; the migrating sodium ions were replaced by hydrogen ions generated from the oxidation of water at the anode. The change in the base and acid concentrations over time in the cathode and anode compartments were measured during the experiments using the titration technique. The current efficiency was determined as the ratio between the number of moles of base formed in the cathode compartment after a given time period over the total number of electron moles that crossed the cell during the same time period.

Figure 7:
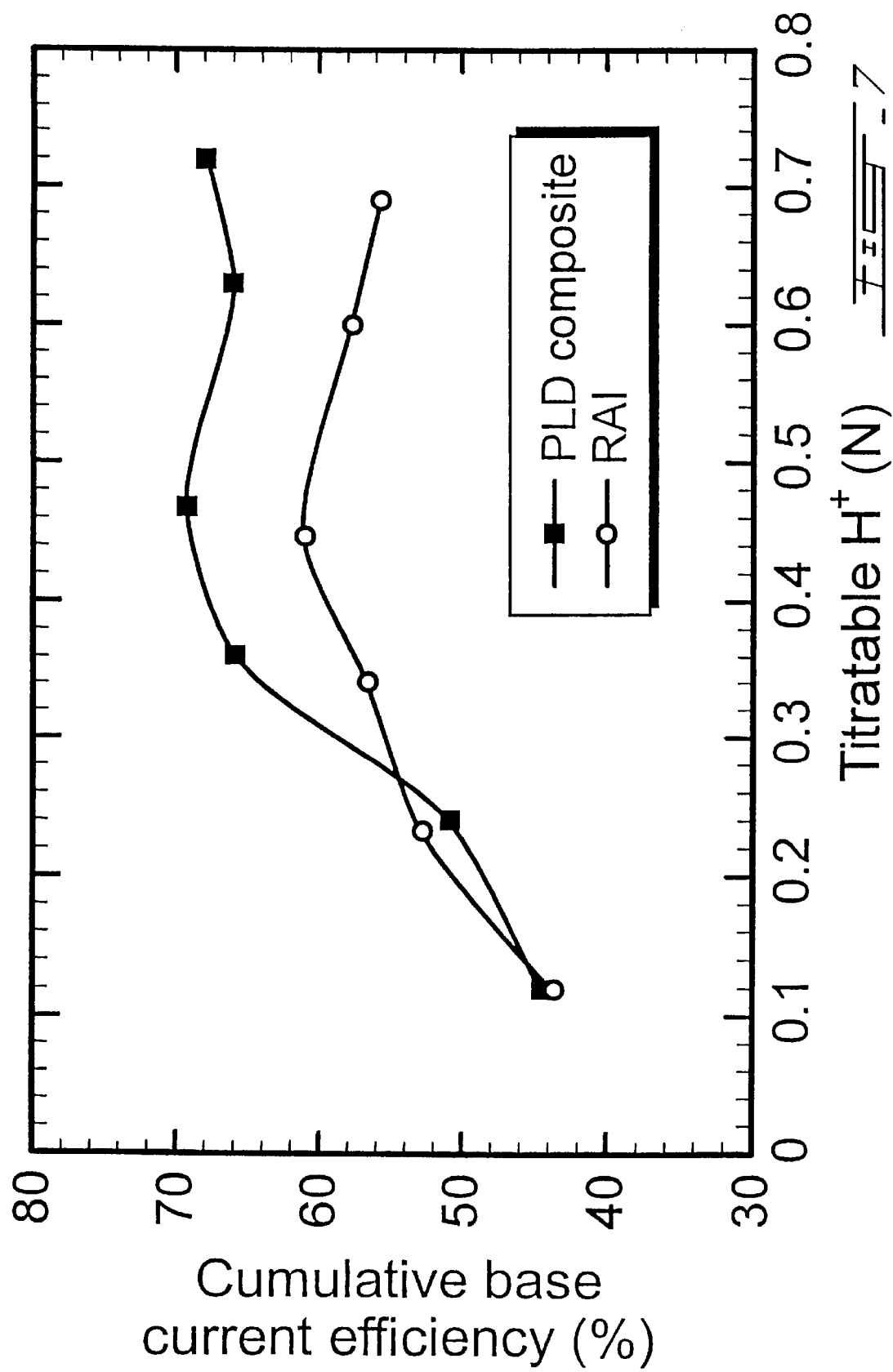
FIGS. 7 and 8 illustrate graphically compositions of cumulative current efficiency in an electrolysis cell of the invention and a prior electrolysis cell.

FIG. 7 compares the cumulative current efficiency for the production of sodium hydroxide from sodium sulphate in an electrolysis cell incorporating an RAI cation-selective membrane (FIG. 1) and a second cell incorporating an RAI-Nasicon composite membrane (FIG. 3). As seen in FIG. 7, for low concentrations of acid (<0.3 N) in the anolyte compartment, no major difference in current efficiency is observed between the two membranes. As the acid concentration builds up, however, the current efficiency of the composite membrane increasingly surpasses that of the polymeric membrane by as much as 12% (68% vs. 56%) at an acid concentration of about 0.7 N of accumulated acid. This corresponds to an improvement in current efficiency of 21.4%.

EXAMPLE 2

As in Example 1, in this example, a Nasicon thin film was deposited on a polymeric Raipore R-4010 cation-selective membrane (manufactured by RAI Research Corporation) using the Pulsed Laser Deposition (PLD) technique. The energy density and the deposition rate were 0.8 J/cm$^2$ and 0.1 Å/pulse, respectively. XPS measurements showed that all the target components including P and Na were well transmitted to the substrate and that the thin film composition was very similar to that of the target. The deposition was carried out at room temperature. XRD measurements showed that the deposited film was amorphous. The thickness of the deposited film was 800 Å.

The electrolysis cells of Example 1 were also used in Example 2. In this example the performance of a polymeric Raipore R-4010 cation-selective membrane manufactured by RAI Research Corporation (FIG. 1) and the composite membrane referred to above were tested. The latter membrane was incorporated into the electrolysis cell with the Nasicon side facing the anode (FIG. 3).

In both cells, the anode compartment was filled with 0.5 L of 1 M sodium sulfate and the cathode compartment with 0.5 L of 1 M sodium hydroxide and the two solutions were re-circulated through the system using a peristaltic pump. The membrane area was 1 cm$^2$ and the applied current density 150 mA/cm$^2$. The voltage of the cells was allowed to vary depending on changes in concentration of the anolyte and catholyte and other changes occurring in the cells. Both the anode and cathode compartments were run in the batch mode. When a voltage was applied between the two electrodes, the sodium ions migrated through the membrane towards the negative electrode; the migrating sodium ions were replaced by hydrogen ions generated from the oxidation of water at the anode. The change in the base and acid concentrations over time in the cathode and anode compartments were measured during the experiments using the titration technique. The current efficiency for sodium hydroxide production was determined as the ratio between the number of moles of base formed in the cathode compartment after a given time period over the total number of electron moles that crossed the cell during the same time period.

Figure 8:
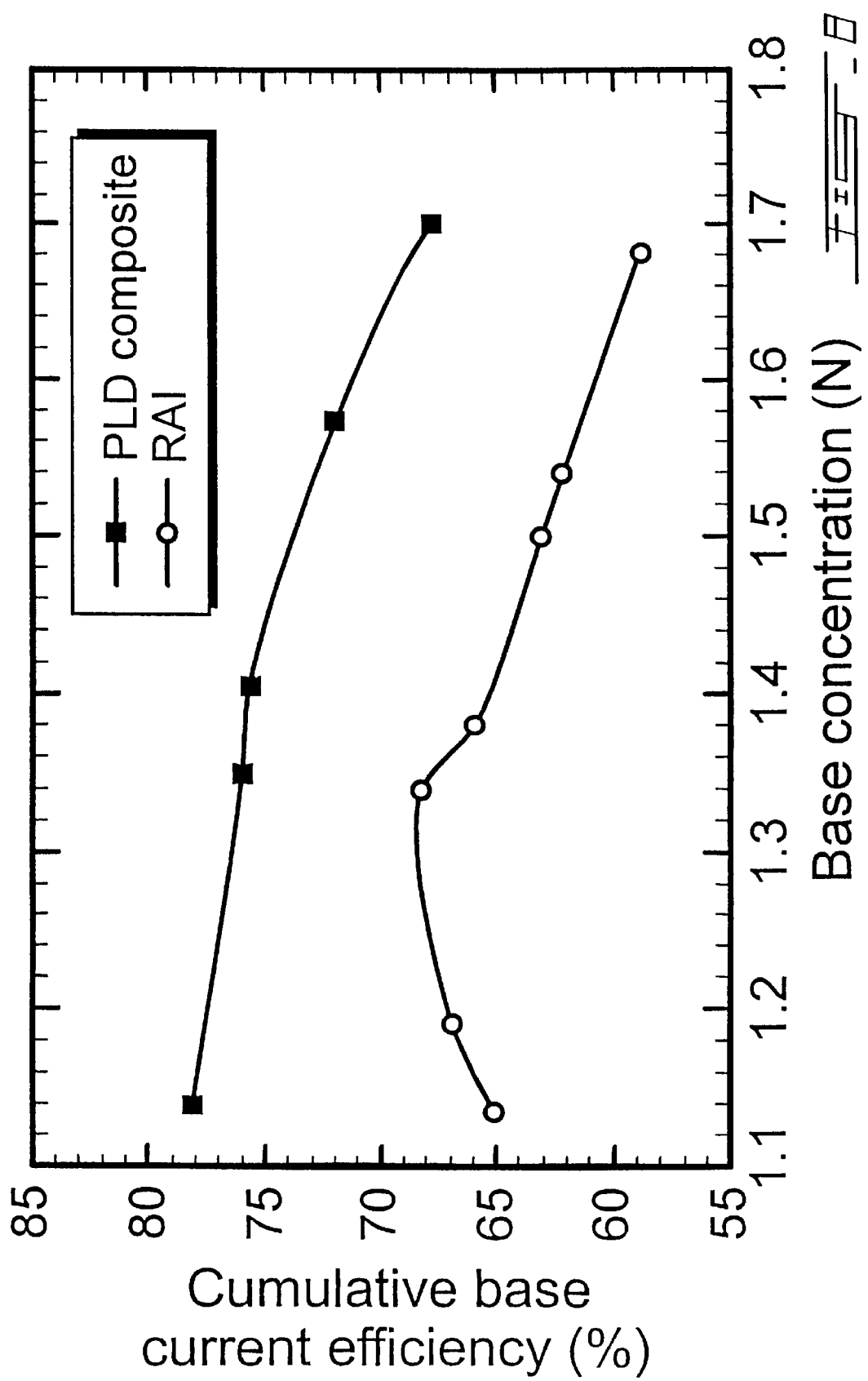

FIG. 8 compares the cumulative current efficiency for the production of sodium hydroxide from sodium sulphate in an electrolysis cell incorporating an RAI cation-selective membrane (FIG. 1) and a second cell incorporating the RAI-Nasicon composite membrane (FIG. 3). As seen in FIG. 8, the current efficiency for the production of base is consistently higher for the composite membrane as compared to the RAI cation-selective membrane under similar conditions of operation. As the acid and base concentrations build up in the anolyte and catholyte compartments, respectively, the current efficiency difference between the two membranes is maintained at about the same level. For example, at an acid concentration in the anolyte of 0.9 N and a base concentration in the catholyte of 1.7 N, the current efficiency for caustic production in the case of the composite membrane was found to be 68% vs. 59% in the case of the polymeric membrane. This corresponds to an improvement in current efficiency of 15.2%.

EXAMPLE 3

As in example 1, in this example, a Nasicon thin film was deposited on a polymeric Raipore R-4010 cation-selective membrane (manufactured by RAI Research Corporation) using the Pulsed Laser Deposition (PLD) technique. The energy density and the deposition rate were 0.8 J/cm$^2$ and 0.1 Å/pulse, respectively. XPS measurements showed that all the target components including P and Na were well transmitted to the substrate and that the thin film composition was very similar to that of the target. The deposition was carried out at room temperature. XRD measurements showed that the deposited film was amorphous. The thickness of the deposited film was 3000 Å.

The electrolysis cells of example 1 were also used in example 3. Using these cells, the fouling resistance of a polymeric Raipore R-4010 cation-selective membrane manufactured by RAI Research Corporation and the composite membrane referred to above were tested. The latter membrane was incorporated into the electrolysis cell with the Nasicon side facing the anode (FIG. 4).

The anode compartment was filled with 2 L of 1 M sodium sulfate containing 275 ppm of ferrous sulphate (101 ppm Fe) and the cathode compartment with 8 L of 1 M sodium hydroxide and the two solutions were re-circulated through the system using a peristaltic pump (FIG. 4). The membrane area was 1 cm and the applied current density 100 mA/cm$^2$. The voltage of the cell was allowed to vary depending on changes in concentration of the anolyte and catholyte and other changes occurring in the cell. As in example 1, the anode compartment was run in the batch mode and the cathode compartment in a simulated feed-and-bleed mode.

Within four days from the beginning of the first experiment, the polymeric RAI 4010 cation-selective membrane developed a blister and was no longer able to pass sodium ions from the anolyte to the catholyte. In contrast, the RAI-Nasicon composite membrane was able to operate under the same conditions for over 26 days without any major impact on the morphology and/or performance of the membrane. As shown in Table 1, even at high acid concentrations, no ferrous and/or ferric ions appear to be crossing the membrane into the catholyte compartment. In addition, as shown in Table 2, the current efficiency of the composite membrane, in the presence of the ferrous sulphate, remains at least as high as that of the RAI membrane with no foulant present.

TABLE 1

| Time (hours) | Acid concentration (N) | Fe in anolyte (mg/L) | Fe in catholyte (mg/L) |
| --- | --- | --- | --- |
| 51 | 0.201 | 42.1 | −0.3 |
| 142 | 0.382 | 43.5 | <D.L. |
| 190 | 0.477 | 43.3 | <D.L. |
| 247 | 0.495 | 43.3 | <D.L. |
| 314 | 0.616 | 44.8 | −0.3 |
| 408 | 0.753 | 44.0 | <D.L. |

TABLE 2

| Membrane type | Acid concentration (N) | Cumulative base current efficiency (%) |
| --- | --- | --- |
| RAI | 0.69 | 56 |
| RAI + Nasicon (with foulant) | 0.75 | 59 |
| RAI + Nasicon (without foulant) | 0.72 | 68 |

As shown in Table 1, during the first 51 hours of operation the concentration of iron in the anode compartment declined from 101 ppm to 42.1 ppm and stabilized thereafter at about 43 ppm. This result suggests that about 55% of the iron (or 110 mg of Fe out of the 202 mg initially present) initially present in solution deposited on the surface of the composite membrane facing the anode. A visual inspection of the membrane revealed a red-brown film on the membrane surface suggesting the presence of iron oxide. These results suggest that in the presence of multivalent cations such as those of iron, bilayer Nasicon-polymer membranes are converted to tri-layer membranes which are likely to present their own unique properties in different applications (FIG. 9).

Figure 9:
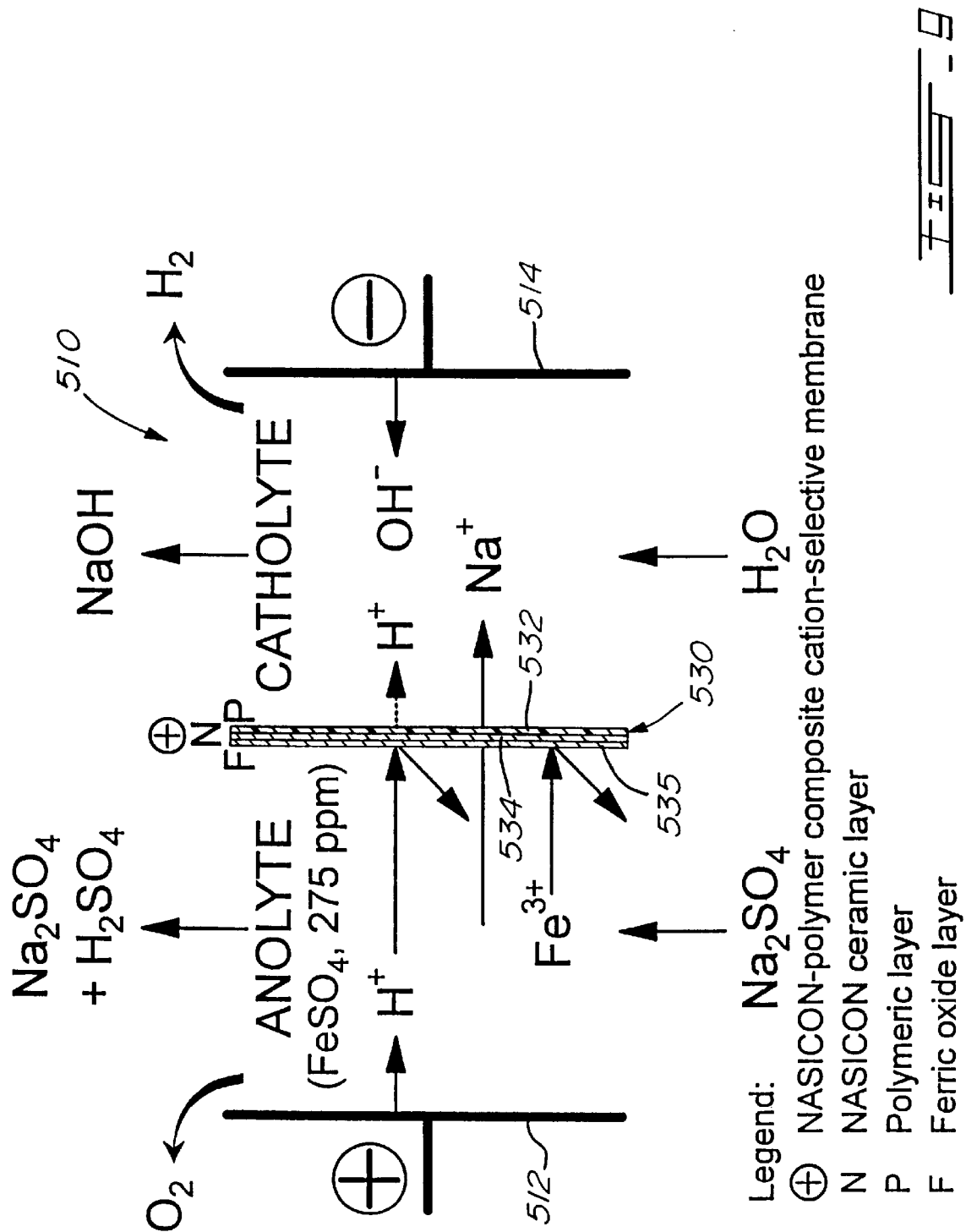
FIG. 9 illustrates schematically an electrolysis cell having a tri-layer composite membrane of the invention.

With further reference to FIG. 9 electrolysis cell 510 comprises anode 512, cathode 514 and a composite cation-selective membrane 530. Composite membrane 530 has a cation-selective polymer membrane substrate 532, a thin inorganic film 534 and a ferric oxide layer 535.

EXAMPLE 4

A Nasicon thin film was deposited on a Raipore® 4010 cation-selective membrane using reactive magnetron sputtering. For this purpose, a Nasicon target of the same composition as the one used in the above three examples was employed. The Nasicon target was prepared by mixing powders of $Na_3PO_4$ and $ZrSiO_4$ in the required ratio. The powder mixture was ground, pressed and sintered at 1200° C. for six hours. The target was installed on planar magnetrons with permanent magnets producing several hundred gauss magnetic field, the glow discharge being concentrated in the high magnetic field region. The reactive magnetron sputtering of Nasicon was produced at working pressures in the range of 10 mTorr to 50 mTorr. XPS, Auger and XRD analysis showed that the Nasicon-thin film deposited on the polymeric membrane by sputtering had an amorphous structure and a composition slightly poor in Na and P as compared to the target. The thickness of the deposited Nasicon film was 1250 Å.

In this example, the electrolysis cells of FIGS. 1 and 3 were used. Using the cells of FIGS. 1 and 3 we tested the performance of a polymeric Raipore R-4010 cation-selective membrane manufactured by RAI Research Corporation (FIG. 1) and the composite membrane referred to above. The latter membrane was incorporated into the electrolysis cell with the Nasicon side facing the anode (FIG. 3).

In both cells, the anode compartment was filled with 0.5 L of 1 M sodium sulfate and the cathode compartment with 0.5 L of 1 M sodium hydroxide and the two solutions were re-circulated through the system using a peristaltic pump. The membrane area was 1 $cm^2$ and the applied current density 150 $mA/cm^2$. The voltage of the cells was allowed to vary depending on changes in concentration of the anolyte and catholyte and other changes occurring in the cells. Both the anode and cathode compartments were run in the batch mode. When a voltage was applied between the two electrodes, the sodium ions migrated through the membrane towards the negative electrode; the migrating sodium ions were replaced by hydrogen ions generated from the oxidation of water at the anode. The change in the base and acid concentrations over time in the cathode and anode compartments were measured during the experiments using the titration technique. The current efficiency was determined as the ratio between the number of moles of base formed in the base compartment after a given time period over the total number of electron moles that crossed the cell during the same time period.

Figure 10:
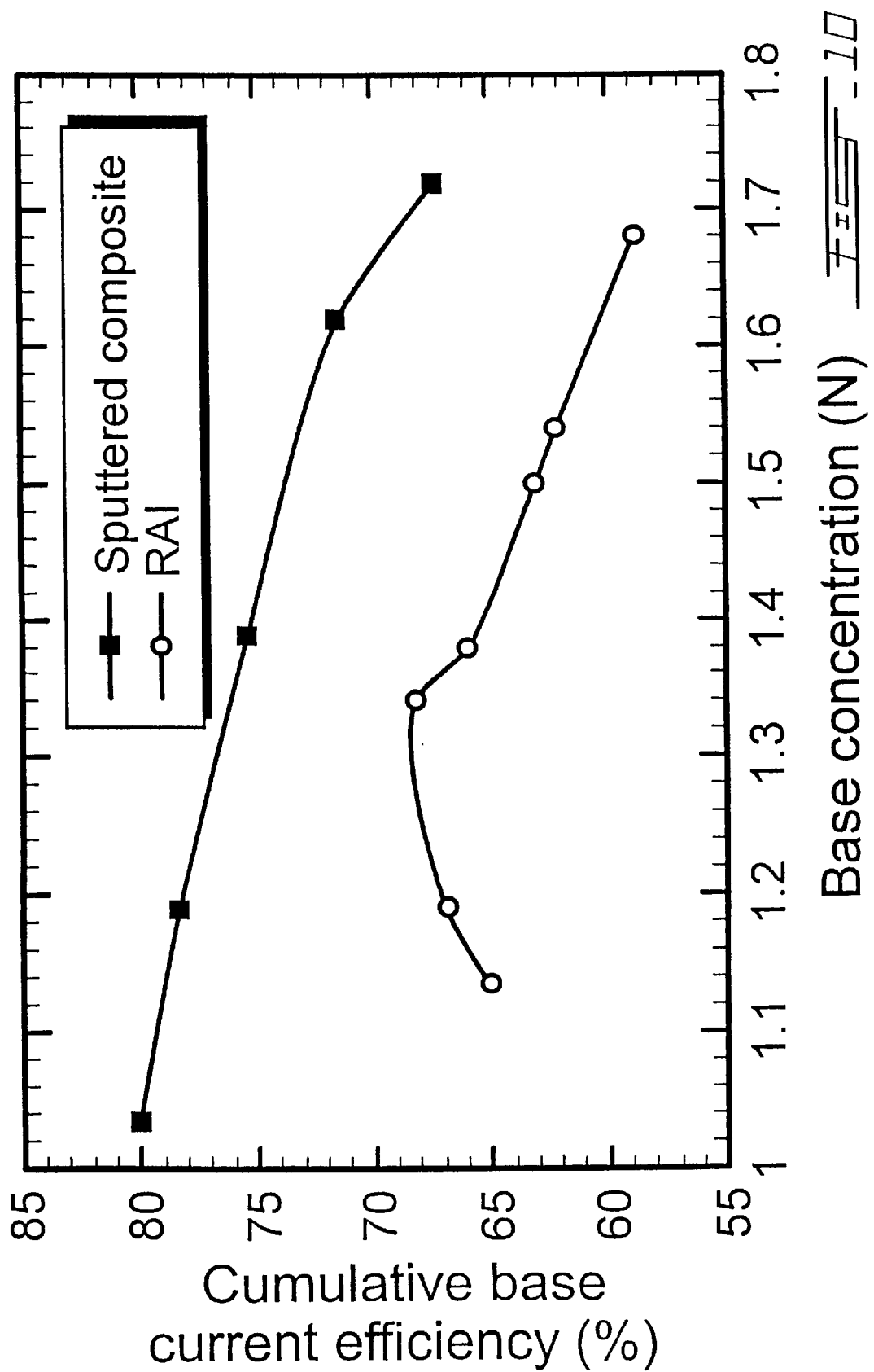
FIG. 10 illustrates graphically a comparison of cumulative current efficiency in another cell of the invention and a prior art cell.

FIG. 10 compares the cumulative current efficiency for the production of sodium hydroxide from sodium sulphate in an electrolysis cell incorporating an RAI cation-selective membrane (FIG. 1) and a second cell incorporating the RAI-Nasicon composite membrane (FIG. 3) prepared using the reactive magnetron sputtering technique. As seen in FIG. 10, the current efficiency for the production of base is consistently higher for the composite membrane as compared to the RAI cation-selective membrane under similar conditions of operation. As the acid and base concentrations build up in the anolyte and catholyte compartments, respectively, the current efficiency difference between the two membranes is maintained at about the same level. For example, at an acid concentration in the anolyte of 0.9 N and a base concentration in the catholyte of 1.7 N, the current efficiency for caustic production in the case of the composite membrane was found to be 68% vs. 59% in the case of the polymeric membrane. This corresponds to an improvement in current efficiency of 15.2%.

EXAMPLE 5

The object of this example is to examine the selectivity of the composite membrane to potassium as compared to sodium ions. As in example 1, in this example, a Nasicon thin film was deposited on a polymeric Raipore R-4010 cation-selective membrane using the Pulsed Laser Deposition (PLD) technique. The energy density and the deposition rate were 0.8 $J/cm^2$ and 0.1 Å/pulse, respectively. XPS measurements showed that all the target components including P and Na were well transmitted to the substrate and that the thin film composition was very similar to that of the target. The deposition was carried out at room temperature. XRD measurements showed that the deposited film was amorphous. The thickness of the deposited film was 3000 Å.

The electrolysis cells of example 1 were also used in example 5. Using these cells, we compared the rate of transfer of sodium and potassium ions through the composite membrane obtained by Pulsed Laser Deposition (PLD). The composite membrane was incorporated in the electrolysis cell with the Nasicon layer facing the anode (FIG. 4).

The anolyte was filled with 2L of a solution 0.5 N in sodium sulfate and 0.5 N in potassium sulfate while the catholyte was filled with 4L of 1 M NaOH. The two solutions were circulated through the cell using a peristaltic pump. The membrane area was 1 $cm^2$ and the current density applied was 150 $mA/cm^2$. The voltage was allowed to vary depending on changes in concentration of the anolyte and catholyte and other changes occurring in the cell. Both the anolyte and the catholyte were run in the batch mode. When a voltage was applied between the two electrodes, sodium and potassium ions migrated through the membrane towards the negative electrode; the migrating sodium and potassium ions were replaced by hydrogen ions generated from the oxidation of water at the anode. The concentration of the two ions in the anolyte was measured periodically using atomic absorption spectroscopy.

Figure 11:
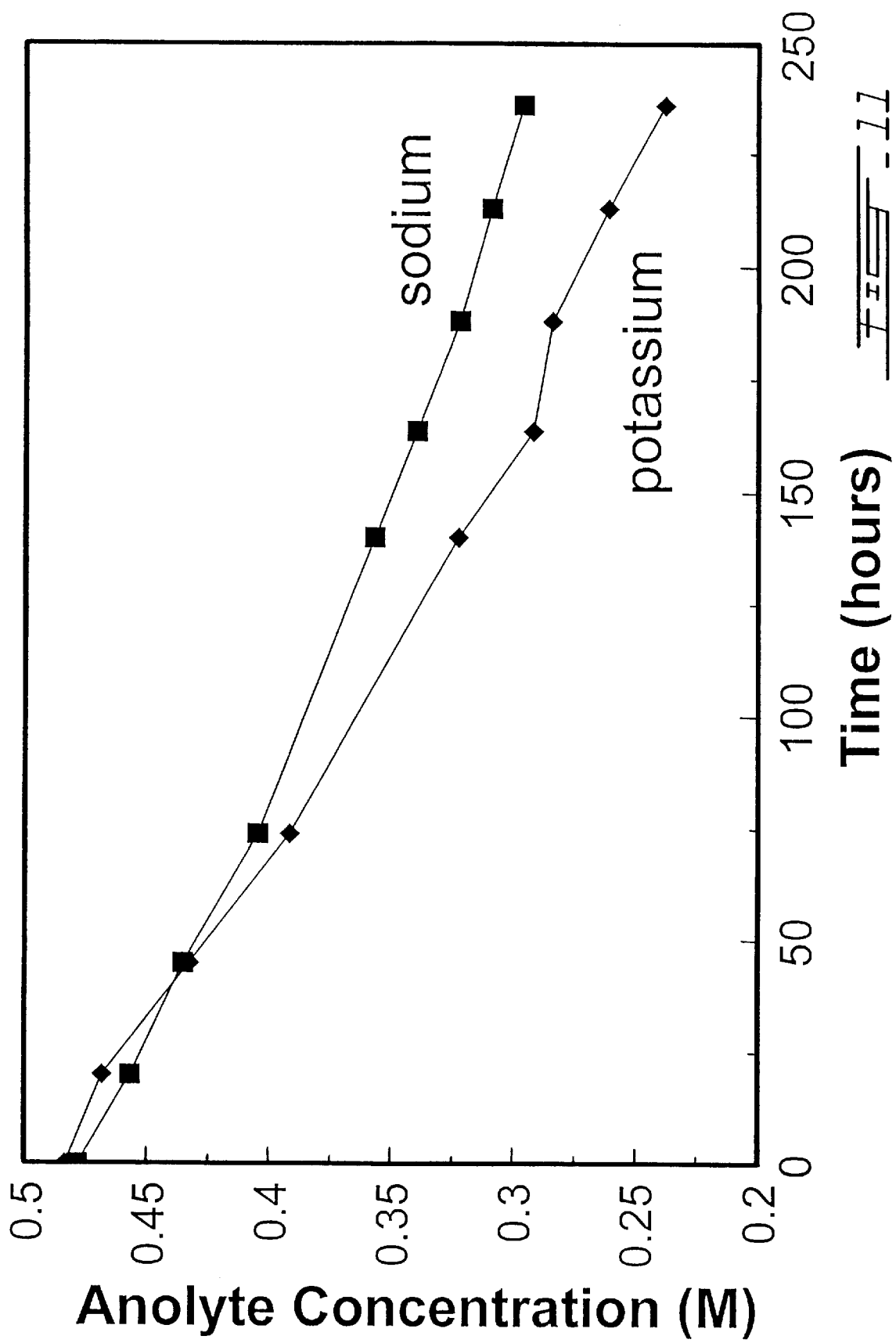
FIG. 11 is a plot comparing the rate of migration of sodium and potassium ions in a cell of the invention.
Figure 17:
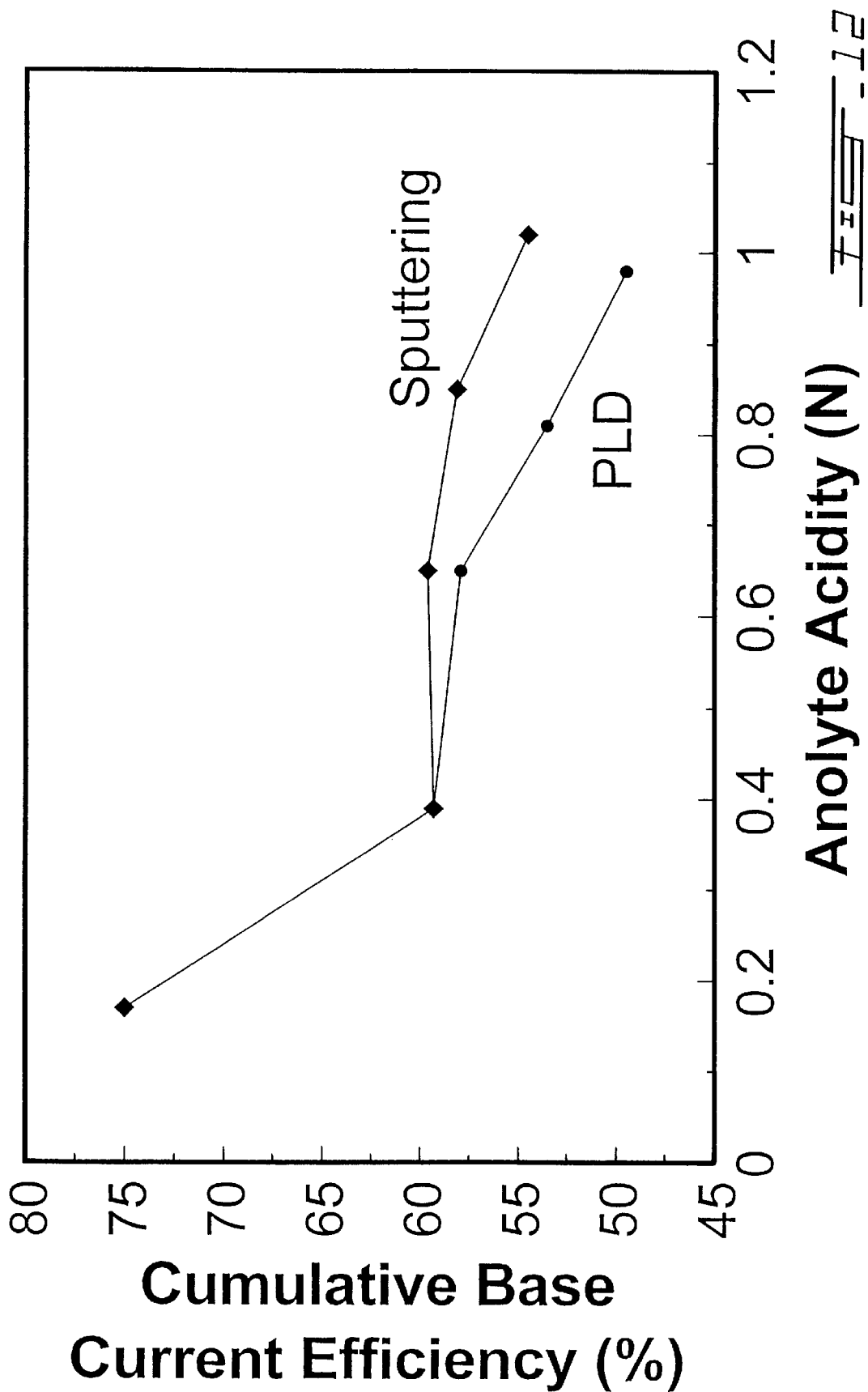

FIG. 11 compares the rate of migration of sodium and potassium ions to the catholyte during the electrolytic splitting of the corresponding sulfate salts using the composite membrane mentioned above. As seen in FIG. 11, the rate of migration of both ions is similar. Potassium ions tend to migrate at a slightly faster rate than sodium ions. This can be attributed to the higher ionic mobility of potassium ions compared to sodium ions. These results show that the composite membrane can be used to split potassium salts at a comparable current efficiency as with the sodium salts.

EXAMPLE 6

The object of this example is to compare the performance of composite membranes prepared by the Pulsed Laser Deposition and Reactive Magnetron Sputtering techniques in the electrolytic splitting of sodium sulfate for the production of acid and base. As in example 1, in this example, a Nasicon thin film was deposited on a polymeric Raipore R-4010 cation-selective membrane (manufactured by RAI Research Corporation) using the Pulsed Laser Deposition (PLD) technique and, as in example 4, a second composite membrane was prepared using the Reactive Magnetron Sputtering technique. The thickness of the inorganic layer of the membrane obtained by PLD was 800 Å. The sputtering technique produced a 1250 Å thin Nasicon film on the polymeric support.

The electrolysis cells of example 1 were also used in example 6. Using these cells, a comparison of the performance of the composite membranes obtained by the two different deposition techniques in sodium sulfate splitting was made. The composite membranes were incorporated in the electrolysis cell with the Nasicon layer facing the anode (FIG. 4).

In both cells, the anolyte was filled with 0.5 L of 1 M $Na_2SO_4$ and the catholyte with 0.5 L of 1 M NaOH. Both solutions were circulated through the cells using a peristaltic pump. The anolyte was run in the batch mode allowing the acid to build up with time. The catholyte was operated in a simulated feed-and-bleed mode with water addition throughout the electrolysis to maintain the caustic concentration constant. The membrane area was 1 cm$^2$ and the current density was 150 mA/cm$^2$ for both cells. The voltage across the cells was allowed to vary depending on changes in concentration of the anolyte and the catholyte and other changes occurring in the cells. When a voltage was applied between the two electrodes, the sodium ions migrated through the membrane toward the negative electrode; the migrating sodium ions were replaced by hydrogen ions generated from the oxidation of water at the anode. The change in base and acid concentrations over time in the catholyte and anolyte respectively was measured using the titration technique. The current efficiency was determined as the ratio between the number of moles of base formed in the catholyte after a given time period over the total number of electron moles that crossed the cell during the same time period.

FIG. 12 compares the cumulative current efficiency for the production of base from sodium sulfate in an electrolysis cell incorporating the composite membrane obtained by Pulsed Laser Deposition and a second cell incorporating the composite membrane obtained by the Reactive Magnetron Sputtering technique. As seen in FIG. 12, the current efficiency for the production of base is comparable in the two systems under similar conditions of operation. This shows that both deposition techniques lead to composite membranes with comparable performance.

EXAMPLE 7

The object of this example is to examine the durability of the inorganic component of the composite membrane when incorporated into an electrolysis cell with the inorganic layer facing the cathode.

As in example 1, in this example, a Nasicon thin film was deposited on a polymeric Raipore R-4010 cation-selective membrane using the Pulsed Laser Deposition (PLD) technique. The energy density and the deposition rate were 0.8 J/cm$^2$ and 0.1 Å/pulse, respectively. XPS measurements showed that all the target components including P and Na were well transmitted to the substrate and that the thin film composition was very similar to that of the target. The deposition was carried out at room temperature. XRD measurements showed that the deposited film was amorphous. The thickness of the deposited layer was 250 Å.

The electrolysis cells of example 1 were also used in example 7. Using these cells, we studied the durability of the composite membrane obtained by Pulsed Laser Deposition (PLD). The composite membrane was incorporated in the electrolysis cell with the Nasicon layer facing the cathode as seen in FIG. 13.

Figure 13:
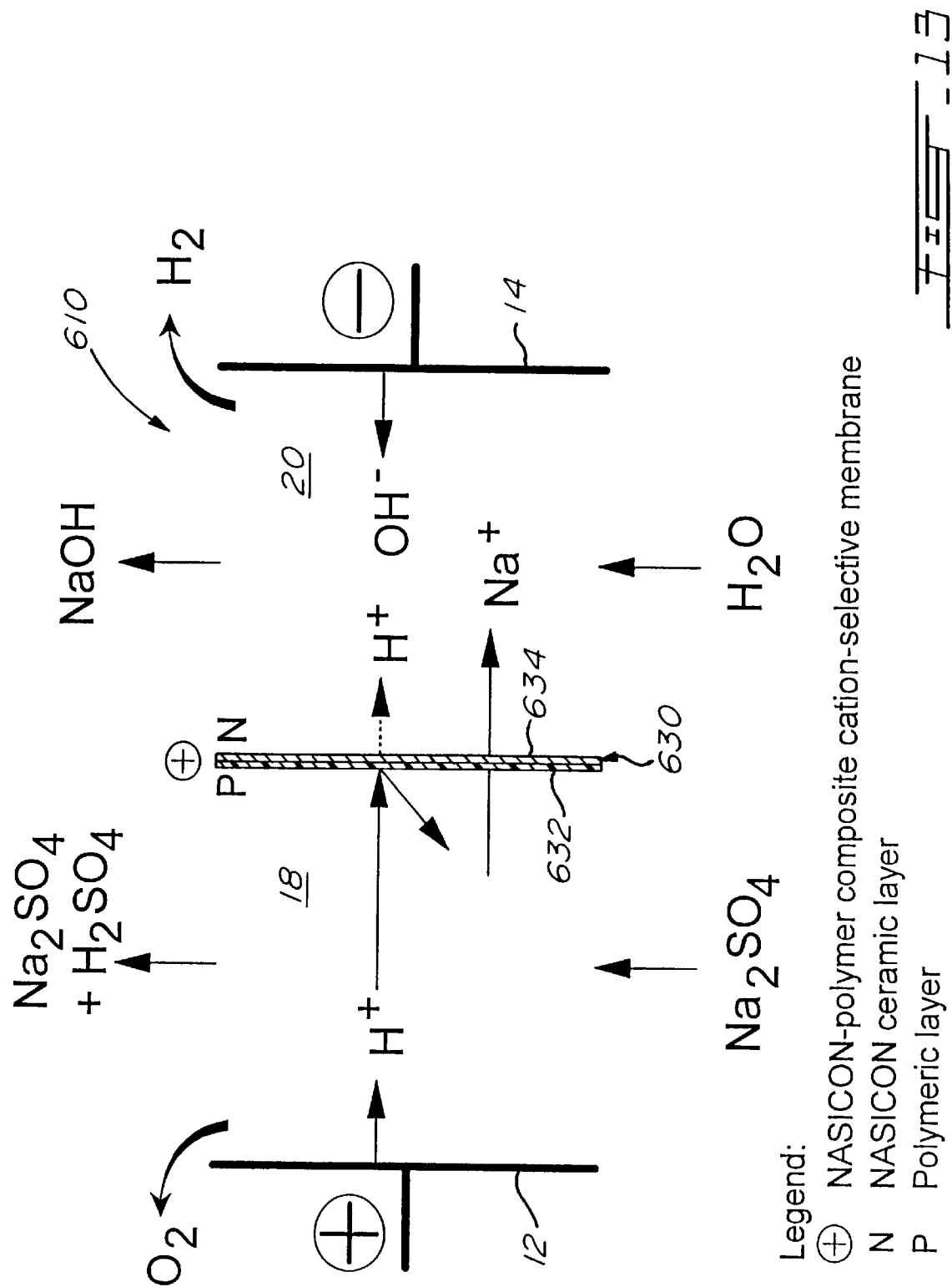
FIG. 13 illustrates schematically a cell of the invention in which the inorganic film of the composite membrane is in opposed facing relationship with the cathode of the cell.

With further reference to FIG. 13, electrolysis cell 610 differs from cell 110 of FIG. 3 in that the thin inorganic film 634 of composite membrane 630 is in facing relationship with cathode 14 and membrane substrate 632 of composite membrane 630 is in facing relationship with anode 12.

The anolyte was filled with 8 L of a solution 1M in sodium sulfate and 0.7 N in sulfuric acid while the catholyte was filled with 8 L of 1 M NaOH. The two solutions were circulated through the cell using a peristaltic pump. The membrane area was 1 cm$^2$ and the current density applied was 150 mA/cm$^2$. The voltage was allowed to vary depending on changes in concentration of the anolyte and catholyte and other changes occurring in the cell. Both anolyte and catholyte were run in the batch mode. The acidity and alkalinity of the anolyte and catholyte, respectively, were adjusted periodically. When a voltage was applied between the two electrodes, sodium ions migrated through the membrane towards the negative electrode; the migrating sodium ions were replaced by hydrogen ions generated from the oxidation of water at the anode. The change in base and acid concentrations over time in the catholyte and anolyte respectively was measured using the titration technique. The current efficiency was determined as the ratio between the number of moles of base formed in the catholyte after a given time period over the total number of electron moles that crossed the cell during the same time period.

Figure 14:
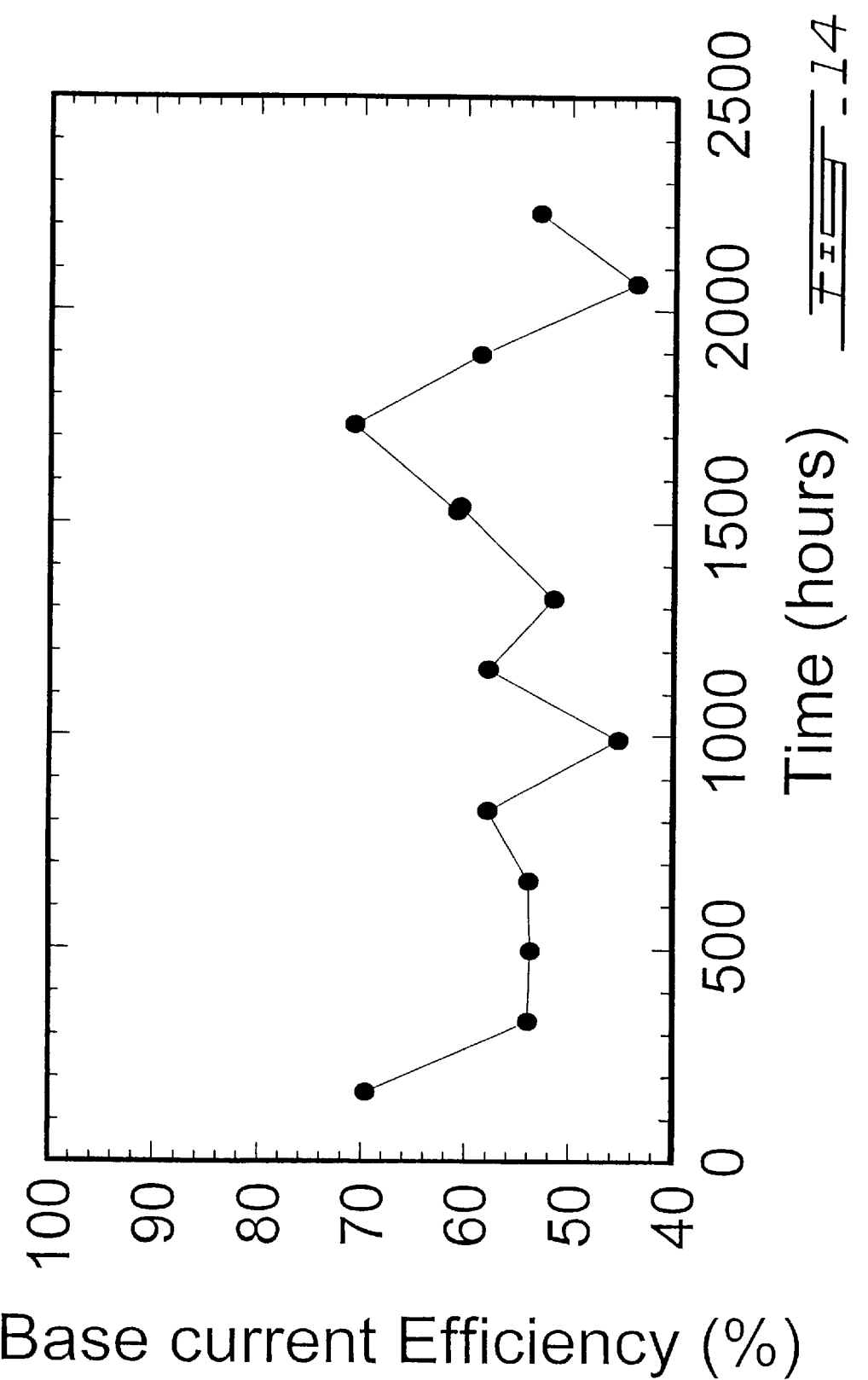
FIG. 14 is a plot showing variation of base current efficiency with time for a composite membrane of the invention.

FIG. 14 shows the variation of the base current efficiency with time for the composite membrane. As seen in this Figure, after an initial decline, the current efficiency remained relatively constant at about 55% during at least 2000 hours of operation. In a similar experiment with the inorganic layer facing the anode, the cumulative current efficiency dropped to about 34% within 200 hours of operation. This decline appears to be due to the partial solubilization of the inorganic layer under the acidic conditions in the anolyte compartment. These experiments, therefore, suggest that in the electrolytic or electrodialytic splitting of salts, it would be preferable for the inorganic layer of the composite membrane to be facing the cathode rather than the anode.

EXAMPLE 8

The object of this example is to compare the performance of the composite membrane with the base polymeric membrane under hydrodynamic conditions that reflect the operation of industrially realistic systems when the anolyte is operated in the batch and the catholyte in the feed-and-bleed modes of operation. As in example 1, in this example, a Nasicon thin film was deposited on a polymeric Raipore R-4010 cation-selective membrane (manufactured by RAI Research Corporation) using the Pulsed Laser Deposition (PLD) technique. The energy density and the deposition rate were 0.8 J/cm$^2$ and 0.1 Å/pulse respectively. The thickness of the inorganic layer of the membrane obtained by PLD was 1200 Å.

A different electrolysis cell was used in this example. The cell was a hexagonal stack cell supplied by Graver- Aqualytics. The thickness of the two spacers in between the two electrodes and the membrane was 1 mm, decreasing the solution contribution to the overall voltage drop across the cell. Flow rates were adjusted to obtain a linear velocity inside the cell of about 4 cm/min. In addition, grids were present in the spacers to promote turbulence so that the hydrodynamic conditions are representative of industrial processes. This cell was used to compare the current efficiency for producing base from sodium sulfate of a polymeric R-4010 cation-selective (membrane manufactured by RAI Research Corporation) and the composite membrane referred to above. The latter was incorporated into the cell with the Nasicon layer facing the anode (FIG. 4).

In both cells, the anolyte was filled with 0.25 L of 1 M $Na_2SO_4$ and the catholyte with 1 L of 1 M NaOH. Both solutions were circulated through the cells using a peristaltic pump. The anolyte was run in the batch mode allowing the acid to build up with time. The catholyte was operated in a simulated feed-and-bleed mode with water addition throughout the electrolysis to maintain the caustic concentration constant. The membrane area was 27 $cm^2$ for both systems. The electrode area was 5.3 $cm^2$. The current density applied was 150 $mA/cm^2$ of electrode area for both systems. The voltage across the cell was allowed to vary depending on changes in concentration of the anolyte and the catholyte and other changes occurring in the cell. When a voltage was applied between the two electrodes, the sodium ions migrated through the membrane toward the negative electrode; the migrating sodium ions were replaced by hydrogen ions generated from the oxidation of water at the anode. The change in base and acid concentrations over time in the catholyte and anolyte, respectively, was measured using the titration technique. The current efficiency was determined as the ratio between the number of moles of base formed in the catholyte after a given time period over the total number of electron moles that crossed the cell during the same time period.

Figure 15:
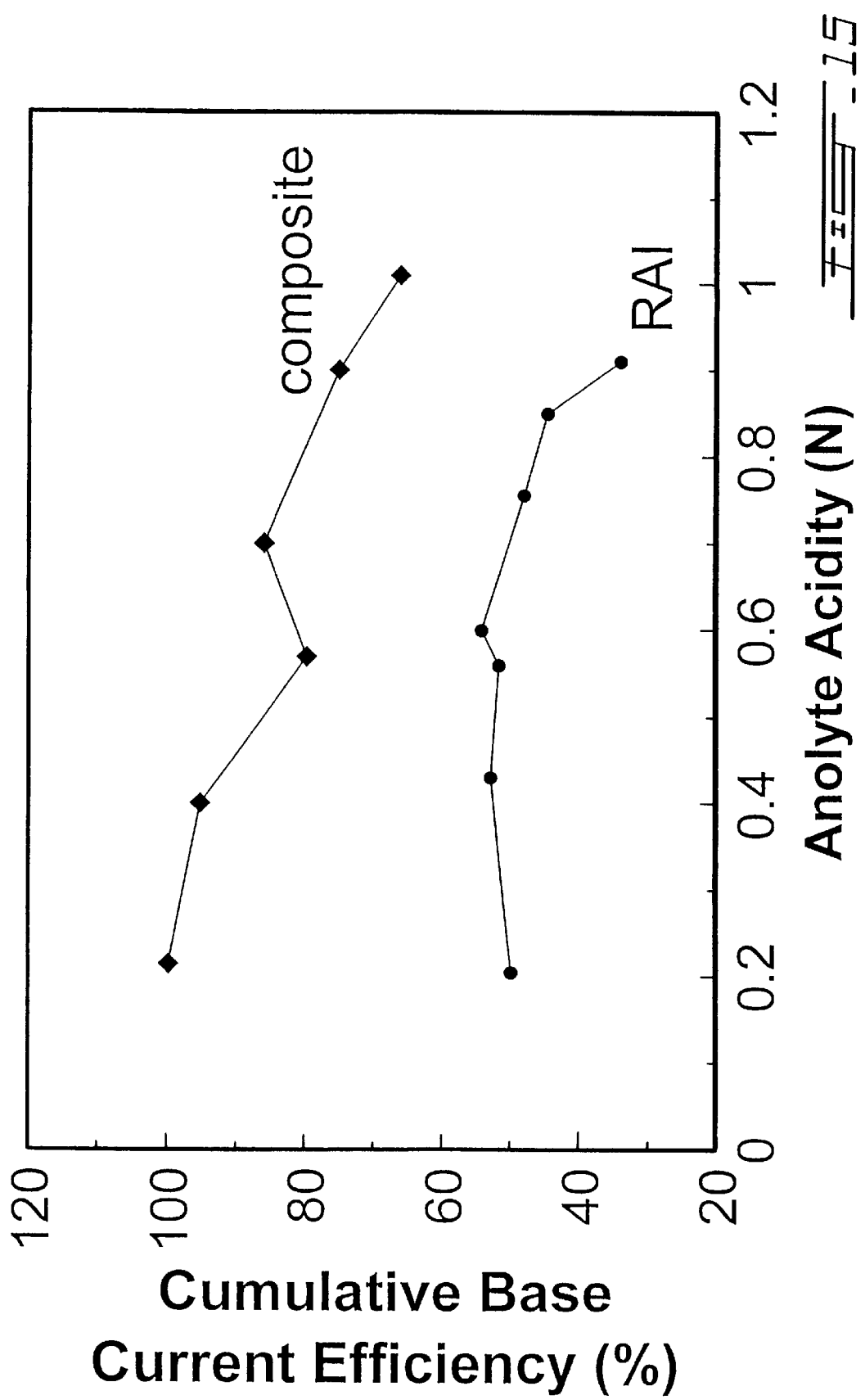
FIG. 15 is a further plot providing a comparison of cumulative current efficiency in a cell of the invention and a prior art cell.

FIG. 15 compares the cumulative current efficiency for the production of sodium hydroxide from sodium sulfate in a system incorporating an R-4010 cation-selective membrane (FIG. 1) and a second system incorporating the composite membrane (FIG. 3). As seen in FIG. 15, the current efficiency for the production of base is consistently higher for the composite membrane as compared to the R-4010 cation-selective membrane under similar conditions of operation. As the acidity in the anolyte builds up, a significant difference in the current efficiency between the two systems is observed. For example, at 0.2 N of acidity, the current efficiency for caustic production is near 100% for the composite membrane compared to about 50% for the polymeric membrane. At an acidity of 0.9 N, the composite membrane shows a cumulative base current efficiency of 74% vs. 34% in the case of the polymeric membrane. This corresponds to an improvement in current efficiency of 120%.

EXAMPLE 9

The object of this example is to compare the performance of the composite membrane with the base polymeric membrane under hydrodynamic conditions that reflect the operation of industrially realistic systems when both the anolyte and catholyte are operated in the feed-and-bleed mode of operation. In addition to current efficiency the two membranes are compared with respect to voltage drop across the cell and energy consumption.

As in example 1, in this example, a Nasicon thin film was deposited on a polymeric Raipore R-4010 cation-selective membrane (manufactured by RAI Research Corporation) using the Pulsed Laser Deposition (PLD) technique. The energy density and the deposition rate were 0.8 $J/cm^2$ and 0.1 Å/pulse, respectively. The thickness of the inorganic layer of the membrane obtained by PLD was 1200 Å.

The electrolysis cell of example 8 was also used in example 9. Using this cell, we compared the performance for sodium sulfate splitting of a polymeric R-4010 cation-selective membrane manufactured by RAI Research Corporation and the composite membrane referred to above. The latter was incorporated into the cell with the Nasicon layer facing the anode (FIG. 4) or facing the cathode (FIG. 13).

In all systems, the anolyte was filled with 8 L of a solution containing 1 M $Na_2SO_4$ and 0.7 N $H_2SO_4$ while the catholyte was filled with 0.5 L of 1 M NaOH. Both solutions were circulated through the cell using a peristaltic pump. The anolyte was run in the batch mode but the large volume used simulated a feed-and-bleed mode. No significant changes in the acidity were measured during the experiment. The catholyte was operated in a simulated feed-and-bleed mode with water added throughout the electrolysis to maintain the caustic concentration constant. The membrane area was 27 $cm^2$ for both cells. The electrode area was 5.3 $cm^2$. The current density applied was 150 $mA/cm^2$ of electrode area for all systems. The voltage across the cell was allowed to vary depending on changes in concentration of the anolyte and the catholyte and other changes occurring in the cell. When a voltage was applied between the two electrodes, the sodium ions migrated through the membrane toward the negative electrode; the migrating sodium ions were replaced by hydrogen ions generated from the oxidation of water at the anode. The change in base and acid concentrations over time in the catholyte and anolyte respectively was measured using the titration technique. The current efficiency was determined as the ratio between the number of moles of base formed in the catholyte after a given time period over the total number of electron moles that crossed the cell during the same time period.

Table 3 compares the voltage drop across the cell, the current efficiency for the production of sodium hydroxide and the energy requirement for the production of 1 kg of NaOH of: a) the cell incorporating a R-4010 cation-selective membrane; b) a second cell incorporating the composite membrane having the inorganic layer facing the catholyte and c) a system in which the composite membrane is oriented so that the inorganic layer faces the anolyte. As seen in Table 3, the voltage across the cell is the same for all systems showing that the deposition of a thin inorganic layer does not increase significantly the electrical resistance of the membrane. The composite membrane having the inorganic layer facing the catholyte presents the highest current efficiency and the lowest energy requirement for the production of NaOH. The current efficiency is higher by 46.2% while the energy consumption is lower by 34.1% compared to the polymeric R-4010 cation-selective membrane. The composite membrane having the inorganic layer facing the anolyte presents an improvement in current efficiency of 10.1% and a reduction in energy consumption of 15.8% for the production of sodium hydroxide compared to the R-4010 cation-selective membrane. The difference in performance between the two orientations of the composite membrane is believed to be caused by the partial dissolution by sulfuric acid of some soluble phase existing in the inorganic layer. In addition, the inorganic layer facing the catholyte may be preventing the back-diffusion of hydroxide ions from the catholyte to the anolyte.

TABLE 3

| Membrane | Voltage drop (V) | Current Efficiency (%) | Energy requirement (kWh/kg NaOH) |
|---|---|---|---|
| R-4010 | 4.9 | 48.5 | 7.13 |
| composite with NASICON layer facing catholyte | 4.9 | 70.9 | 4.7 |
| composite with NASICON layer facing anolyte | 4.9 | 53.4 | 6.0 |

It will be evident to those skilled in the art that the energy requirements quoted in Table 3 could be improved in all three systems by operating at higher temperatures and higher concentrations of sodium sulphate in the anolyte solution.

We claim:

1. A flexible composite cation-selective membrane comprising:
   a membrane substrate of an ion-conducting organic polymer and a thin film on said substrate of an inorganic ion-conducting material said thin film having a thickness of 10 Å to 10 μm.

2. A composite membrane according to claim 1 wherein said membrane substrate has a thickness of 0.02 mm to 0.5 mm.

3. A composite membrane according to claim 1 wherein said thin film has a thickness of 200 Å to 3000 Å and said membrane substrate has a thickness of 0.1 mm to 0.3 mm.

4. A composite membrane according to claim 3 wherein said thin film is conductive to at least one of sodium ions or potassium ions.

5. A composite membrane according to claim 3 which is a bilayer composite consisting of said membrane substrate having said thin film deposited therein.

6. A composite membrane according to claim 1 having an additional ion-conductive layer on said thin film.

7. A composite membrane according to claim 1 wherein said thin film is of a ceramic having amorphous, crystalline or both amorphous and crystalline character.

8. A method of producing a flexible composite cation-selective membrane comprising:
   providing a membrane substrate of an ion-conducting organic polymer, and
   depositing on said substrate, a thin film of an inorganic ion-conducting material said thin film having a thickness of 10 Å to 10 μm.

9. A method according to claim 8 wherein said depositing comprising pulse laser deposition of said inorganic material onto said substrate from a source of said material such that the stoichiometry of the inorganic material in the source is present in the deposited film.

10. A method according to claim 8 wherein said depositing comprises reactive magnetron sputtering of said inorganic material onto said substrate from a source of said material such that the stoichiometry of the inorganic material in the source is present in the deposited film.

11. A method according to claim 8 wherein said inorganic material is conductive to at least one of sodium ions or potassium ions, and said substrate has a thickness of 0.02 mm to 0.5 mm.

12. A method according to claim 8 wherein said thin film is of ceramic material having amorphous, crystalline or mixed amorphous and crystalline character.

13. In an electromembrane system in which a cation-selective membrane is disposed in a cell between an anode and a cathode and cations in the cell migrate through said membrane towards said cathode, the improvement wherein said cation-selective membrane is a composite membrane comprising
   a membrane substrate of an ion-conducting organic polymer, and a thin film on said substrate of an inorganic ion-conducting material said thin film having a thickness of 10 Å to 10 μm.

14. A system according to claim 13 wherein said substrate has a thickness of 0.02 mm to 0.5 mm, and said cations are selected from sodium ions or potassium ions.

15. A system according to claim 14 for production of acid and base from a salt, said cell further including at least a pair of bipolar membranes.

16. A system according to claim 14 for concentration or dilution of salt, acid or base solutions, said cell further including at least an additional composite cation selective membrane and two anion-selective membranes, the latter being in an alternate arrangement with the former.

17. A system according to claim 13 wherein said thin film is in opposed facing relationship with said cathode or anode.

18. In a system for detection or quantitation of a chemical species in a cell having an electrode probe and a cation-selective membrane, the improvement wherein said cation-selective membrane is a composite membrane comprising
   a membrane substrate of an ion-conducting organic polymer, and a thin film on said substrate of an inorganic ion-conducting ceramic material said thin film having a thickness of 10 Å to 10 μm.

19. In an electromembrane cell comprising an anode and a cathode with a cation-selective membrane therebetween, the improvement wherein said cation-selective membrane is a composite membrane comprising
   a membrane substrate of an ion-conducting organic polymer, and a thin film on said substrate of an inorganic ion-conducting material said thin film having a thickness of 10 Å to 10 μm.

20. A cell according to claim 19 wherein said thin film is in an opposed facing relationship with said cathode or anode.

* * * * *